US010776891B2

(12) United States Patent
Lyte et al.

(10) Patent No.: US 10,776,891 B2
(45) Date of Patent: Sep. 15, 2020

(54) POLICY DISRUPTION EARLY WARNING SYSTEM

(71) Applicant: The MITRE Corporation, McLean, VA (US)

(72) Inventors: Alex Lyte, McLean, VA (US); Haven Liu, McLean, VA (US); Shaun Michel, McLean, VA (US); David Slater, McLean, VA (US)

(73) Assignee: The MITRE Corporation, McLean, VA (US)

( * ) Notice: Subject to any disclaimer, the term of this patent is extended or adjusted under 35 U.S.C. 154(b) by 270 days.

(21) Appl. No.: 15/721,134

(22) Filed: Sep. 29, 2017

(65) Prior Publication Data

US 2019/0102856 A1    Apr. 4, 2019

(51) Int. Cl.
*G06Q 50/26* (2012.01)
*G06Q 30/00* (2012.01)
*G06Q 50/18* (2012.01)

(52) U.S. Cl.
CPC .......... *G06Q 50/26* (2013.01); *G06Q 30/018* (2013.01); *G06Q 50/18* (2013.01)

(58) Field of Classification Search
CPC ....... G06Q 50/26; G06Q 50/18; G06Q 30/018
USPC ....................................................... 705/311
See application file for complete search history.

(56) References Cited

U.S. PATENT DOCUMENTS

| 8,661,066 | B2 | 2/2014 | Rhoads et al. |
| 8,788,523 | B2 | 7/2014 | Martin et al. |
| 9,053,179 | B2 | 6/2015 | Zhang et al. |
| 9,070,103 | B2 | 6/2015 | Kemp |
| 9,336,305 | B2 | 5/2016 | Zhang et al. |
| 2002/0107698 | A1* | 8/2002 | Brown ............. G06Q 10/06375 709/202 |
| 2004/0024739 | A1* | 2/2004 | Copperman .......... G06F 16/367 |
| 2007/0271299 | A1 | 11/2007 | Wang et al. |
| 2009/0043797 | A1 | 2/2009 | Dorie et al. |
| 2011/0208662 | A1 | 8/2011 | Haunschild |
| 2014/0025593 | A1 | 1/2014 | Dolin et al. |
| 2015/0169677 | A1 | 6/2015 | Noiman |

(Continued)

FOREIGN PATENT DOCUMENTS

CN            104462215            3/2015

OTHER PUBLICATIONS

Lyte, Alexander, David Slater, and Shaun Michel, "Network Measures of the United States Code," [online], archived on Feb. 2016, available at: < https://web.archive.org/web/20160222050110/https://www.mitre.org/sites/default/files/publications/pr-15-1489-network-measures-of-united-states-code.pdf > (Year: 2016).*

(Continued)

*Primary Examiner* — Minnah L Seoh
*Assistant Examiner* — Richard W. Crandall
(74) *Attorney, Agent, or Firm* — Morrison & Foerster LLP

(57) ABSTRACT

The present disclosure is directed to a legal path analysis framework that can efficiently evaluate the impact of legislation on U.S. federal government agencies. This framework and its implementation as a database drive web application can enable policy analysts, research, government agencies, etc. to trace and visualize the path of changes to the United States Code (U.S.C.) and Code of Federal Regulations (C.F.R) as well as highlight federal agencies that are ultimately affected by these changes in the legal system.

11 Claims, 20 Drawing Sheets

(56) References Cited

U.S. PATENT DOCUMENTS

2018/0053128 A1* 2/2018 Costas .................. G06Q 50/18

OTHER PUBLICATIONS

E-CFR—Title 39—Postal Service [online], Archived on Sep. 8, 2015, available at: < https://web.archive.org/web/20150908025902/https://www.ecfr.gov/cgi-bin/ECFR?SID=dffa6a43d9b78b334f810370048b90a5&mc=true&page=browse > (Year: 2015).*

Govinfo.com, "Browse A to Z" [online], available at: < https://web.archive.org/web/20160902222115/www.govinfo.gov/browse-a-z >, archived on Sep. 2, 2016, last accessed Nov. 20, 2019 (Year: 2016).*

Smith, Thomas A., "The Web of Law," San Diego Law Review, vol. 44 p. 309, published in 2007 (Year: 2007).*

Li, W.; Azar, P.; Larochelle, D.; Hill, P.; Lo, A. W. (2015). Law is code: software engineering approach to analyzing the united states code. Journal of Business Technology Law, 10(2), 297-374 (Year: 2015).*

Marx, S. M. (1970). Citation networks in the law. Jurimetrics Journal, 10(4), 121-137 (Year: 1970).*

Koniaris, Marios, et al., "Network Analysis in the Legal Domain: A complex model for European legal sources." [online], available at < https://arxiv.org/pdf/1501.05237.pdf >, published on Feb. 9, 2017, last accessed Nov. 20, 2019 (Year: 2017).*

"How to Search the e-CFR" [online], Archived on Jul. 11, 2017, available at: < https://web.archive.org/web/20170711174446/https://www.ecfr.gov/cgi-bin/ECFR?SID=df22adc6e3b7c6227208afa29e1a15b1&mc=true&page=searchtips >, last accessed Jul. 28, 2020 (Year: 2017).*

Tabor, Aaron, "How to Use Python Regular Expressions," The Geek Stuff [online], published on Aug. 25, 2014, available at: < https://www.thegeekstuff.com/2014/08/parse-text-file-using-python/ > (Year: 2014).*

Hornibrook, Shane "& Degrees. Of Separation: Social Network Analysis Using the SAS@ System," [online], published in 2007, available at: < https://www.lexjansen.com/nesug/nesug07/np/np10.pdf > (Year: 2007).*

Anonymous (2007) "Complinet Expands Its Global Regulatory Affairs Team to Meet Unprecedented Demand for Tracker," Business Wire 28; 3 pages.

Anonymous (2007) "LexisNexis(R) makes Powerful Legal Analysis Tools from Potomac Publishing Company(R) Available Exclusively on lexis.com(R)," Business Wire 20; 2 pages.

* cited by examiner

FIGURE 2

AGENCY CFR RESPONSIBILITIES

| 40 ENVIRONMENTAL PROTECTION AGENCY | | | 12 FEDERAL DEPOSIT | 12 INPUT | 12 FARM |
|---|---|---|---|---|---|
| | | | 12 FEDERAL RESERVE | 12 | |
| | | | 12 COMPTROLLER OF | 12 | |
| | | | 46 COAST GUARD | | |
| 7 AGRICULTURAL MARKETING SERVICE | 7 FARM SERVICE AGENCY | 7 RURAL | 42 CENTERS FOR MEDICARE & MEDICAL SERVICES | | 42 PUBLIC HEALTH SERVICE |
| | 7 RURAL HOUSING SERVICE | 7  7 | | | |
| 7 RURAL UTILITIES SERVICE | 7  7  7 | | 14 FEDERAL AVIATION ADMINISTRATION | | 14 SECRETARY OF |
| | 7 | | | | 14 |
| 32 ADVANCED RESEARCH PROJECTS AGENCY | 32 NATIONAL INTELLIGENCE | 32 ARMY | | | |
| 32 DEFENSE CONTRACT AUDIT AGENCY | 32 NATIONAL IMAGERY AND MAPPING AGENCY | 32 NAVY | 30 MINE SAFETY AND HEALTH ADMINISTRATION | 30 | 30 |
| 32 DEFENSE INTELLIGENCE AGENCY | 32 SECRETARY OF DEFENSE OFFICE | | 30 SURFACE MINING | 30 | |

FIGURE 9A

IMPACT OF PL ON THIS AGENCY

DEPARTMENT OF VETERANS AFFAIRS ×

| DATE/CONGRESS | NAME | LABELS | DEGREE | USC IMPACT | CFR IMPACT ↓ |
|---|---|---|---|---|---|
| 113 | VA EXPIRING AUTHORITIES EXTENSION ACT OF 2013 | AFFECTSAGENCYUSC | 4 | 2 | 23 |
| 114 | DEPARTMENT OF VETERANS AFFAIRS DENTAL INSURANCE REAUTHORIZATION ACT OF 2016 | AFFECTSAGENCYUSC, AGENCYMENTION | 5 | 1 | 23 |
| 113 | DEPARTMENT OF VETERANS AFFAIRS EXPIRING AUTHORITIES ACT OF 2013 | AFFECTSAGENCYUSC, AGENCYMENTION | 5 | 1 | 23 |
| 114 | DEPARTMENT OF VETERANS AFFAIRS EXPIRING AUTHORITIES ACT OF 2015 | AFFECTSAGENCYUSC, AGENCYMENTION | 5 | 1 | 23 |
| 113 | DEPARTMENT OF VETERANS AFFAIRS EXPIRING AUTHORITIES ACT OF 2014 | AFFECTSAGENCYUSC, AGENCYMENTION | 5 | 1 | 23 |
| 114 | VETERANS IDENTIFICATION CARD ACT 2015 | AFFECTSAGENCYUSC | 4 | 1 | 23 |

FIGURE 13

POLICY DISRUPTION EARLY WARNING SYSTEM

FIELD OF THE DISCLOSURE

The present disclosure is directed to a legal path analysis framework that can efficiently evaluate the impact of legislation on U.S. federal government agencies. More specifically, the framework and its implementation can trace and visualize the path of changes to the United States Code (U.S.C.) and Code of Federal Regulations (C.F.R) as well as highlight federal agencies that are ultimately affected by these changes in the legal system.

BACKGROUND

The United States (U.S.) legal system includes several major bodies of legal texts which outline the authorities and responsibilities of federal government agencies such as the IRA, VA, DISA, Air Force, GPO, CTH, USAID, FAA, and DOD. Congress can introduce and pass various bills and resolutions which can affect the scope of these federal agencies. These enacted bills become public laws and a part of the United States Code (U.S.C.) is modified to incorporate these public law. These changes to the U.S.C. can create and eliminate agencies, modify their funding, and/or expand or contract their jurisdiction. One of the main roles of federal agencies is to execute and enforce the laws of the U.S. government. The federal agencies must update their rules and regulations in the Code of Federal Regulations (C.F.R.) to abide by any changes to the U.S.C. Besides updating the C.F.R., the federal agencies can also make changes to their internal policy documents.

Since 1973, there have been over 11,000 enacted public laws averaging about 500 per year. The U.S.C. alone contains over 47,000 pages of text and over 43 million words. In addition, federal agencies and various departments issue around 8,000 federal regulations each year. Accordingly, the collective legal corpora are immense, complex, and constantly changing.

SUMMARY

Federal agencies have to implement and comply with the collective legal bodies of immense, complex, and constantly changing text. As such, these agencies need to identify any updates to the law and implement them into their regulations and policies. However, forecasting the potential impact of newly passed legislation on the greater legal system and the government agencies that the legislation regulates is difficult due to the multiple cross-referenced layers of immense legal corpora. In fact, many agencies manually search the newly passed legislation with guidance from their legal department in order to determine the impact the legislation has on the agency. In addition, searching these vast and ever changing bodies of legal text is computationally inefficient. Furthermore, the interplay between the laws, regulations, and policies and the various government agencies is hard to visualize as there is no clear diagram for showing how the laws work together.

Applicants have discovered a legal path analysis framework that can efficiently evaluate the impact of legislation on U.S. federal government agencies. This framework and its implementation as a database driven web application can enable policy analysts, research, government agencies, etc. to trace and visualize the path of changes to the United States Code (U.S.C.) and Code of Federal Regulations (C.F.R) as well as highlight federal agencies that are ultimately affected by these changes in the legal system. Applicants discovered that citations between classes of legal documents can indicate procedural dependencies. As such, Applicants created a legal citation network from open data on laws, regulations, and policies (LRP) to model their interdependencies and interactions with federal agencies. Specifically, Applicants modeled the various legal documents as nodes in a network and the citations between the documents as edges in the network. Content and topics from the legal documents can be extracted to make them searchable. As such, Applicants' network can answer various legal queries.

By using this legal citation network, Applicants discovered a way to construct an early warning system for potential disruptions to agencies' existing policies and programs that can be handled by a computer more efficiently. In addition, Applicants built interfaces to allow users to monitor changes in LRPs and understand the impact on a given agency. The interface can allow users to search the legal citation network by topic and topology as well as perform case studies.

Some embodiments include a method for determining the impact of at least one federal public law on a federal agency, the method comprising: creating a citation network comprising: creating a node for at least one federal agency; a node for at least one title of the Code of Federal Regulations (CFR), a node for at least one title of the Code of Laws of the United States of America (U.S.C.), and a node for at least one federal public law; determining titles of the CFR that are relevant to the at least one federal agency; in response to determining titles of the CFR that are relevant to the at least one federal agency, creating an edge between the corresponding determined CFR title node and the corresponding federal agency node; determining citations to the U.S.C. in the CFR; in response to determining a citation to the U.S.C. in the CFR, creating an edge between the corresponding cited U.S.C. title node and the corresponding CFR title node; determining citations to federal public laws in the U.S.C.; and in response to determining a citation to federal public laws, creating an edge between the corresponding cited federal public law node and the U.S.C. title node; and determining the federal agency associated with the at least one federal public law using the citation network.

In some embodiments, determining the federal agency associated with the at least one federal public law using the citation network comprises determining if edges exist: between the node of the at least one federal public law and a node of a U.S.C. title; between the node of the U.S.C. title and a node of a C.F.R. title; and between the node of the C.F.R. title and a node of the federal agency. In some embodiments, in response to determining that the edges exist between the node of the at least one federal public law and the node of the U.S.C. title, between the node of the U.S.C. title and the node of the C.F.R. title, and between the node of the C.F.R. title and the node of the federal agency, displaying the edges and nodes between the at least one federal public law, the U.S.C. title, the C.F.R. title, and the federal agency. In some embodiments, determining titles of the CFR that are relevant to the at least one federal agency comprises determining federal agencies that are named in C.F.R. titles. In some embodiments, determining titles of the CFR that are relevant to the at least one federal agency comprises determining citations to C.F.R. titles in rules in the Federal Register and connecting a federal agency to a specific C.F.R. title cited in a rule in the Federal Register issued by the federal agency. In some embodiments, the method further comprises receiving a request to determine the impact of a first federal public law on a first federal agency. In some embodiments, in response to receiving a request to determine the impact of the first federal public law on the first federal agency, displaying a legal citation network comprising: an edge between a node of a first U.S.C. title and a node of the first federal public law cited in a section of the U.S.C. under the first U.S.C. title; an edge between a node of a first C.F.R. title and the node of the first U.S.C. title cited in a section of the C.F.R. under the first C.F.R. title; and an edge between a node of a first federal agency and the node of the first C.F.R. title that is relevant to the first federal agency.

In some embodiments, creating a citation network further comprises: creating a node for a federal bill; determining citations to the U.S.C. in the federal bill; and in response to determining a citation to the U.S.C. in the federal bill, creating an edge between the corresponding cited U.S.C. title node and the federal bill node. In some embodiments, the method further comprises determining a federal agency associated with the federal bill using the citation network. In some embodiments, creating a citation network further comprises: creating a node for an Executive Order; determining citations to the C.F.R. in the Executive Order; and in response to determining a citation to the C.F.R. in the Executive Order, creating an edge between the corresponding cited C.F.R. title node and the Executive Order node. In some embodiments, the method further comprises determining each federal agency associated with the Executive Order using the citation network.

Some embodiments include a nontransitory computer readable storage medium storing one or more programs, the one or more programs comprising instructions, which when executed by an electronic device, cause the device to perform the methods described above and herein. Some embodiments include an electronic device comprising one or more processors; memory; and one or more programs, wherein the one or more programs are stored in the memory and are configured to be executed by the one or more processors, the one or more programs including instructions for performing the methods described above and herein.

Some embodiments include an electronic device comprising one or more processors; memory; and one or more programs, wherein the one or more programs are stored in the memory and configured to be executed by the one or more processors, the one or more programs including instructions for any of the methods described above. Some embodiments include a nontransitory computer readable storage medium storing one or more programs, the one or more programs comprising instructions, which when executed by an electronic device, cause the device to perform any of the methods described above.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Unless specifically stated otherwise as apparent from the following discussion, it is appreciated that, throughout the description, discussions utilizing terms such as "processing," "computing," "calculating," "determining," "displaying," "obtaining," "identifying," or the like, refer to the action and processes of a computer system, or similar electronic computing device, that manipulates and transforms data represented as physical (electronic) quantities within the computer system memories or registers or other such information storage, transmission, or display devices.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which:

FIG. 2 illustrates a heatmap of the U.S.C.

FIGS. 9A-9B illustrate a heatmap for various federal agencies C.F.R. responsibilities.

FIG. 13 illustrates a user interface that provides an example of the impact a public law has on an agency.

DETAILED DESCRIPTION

Figure 1:
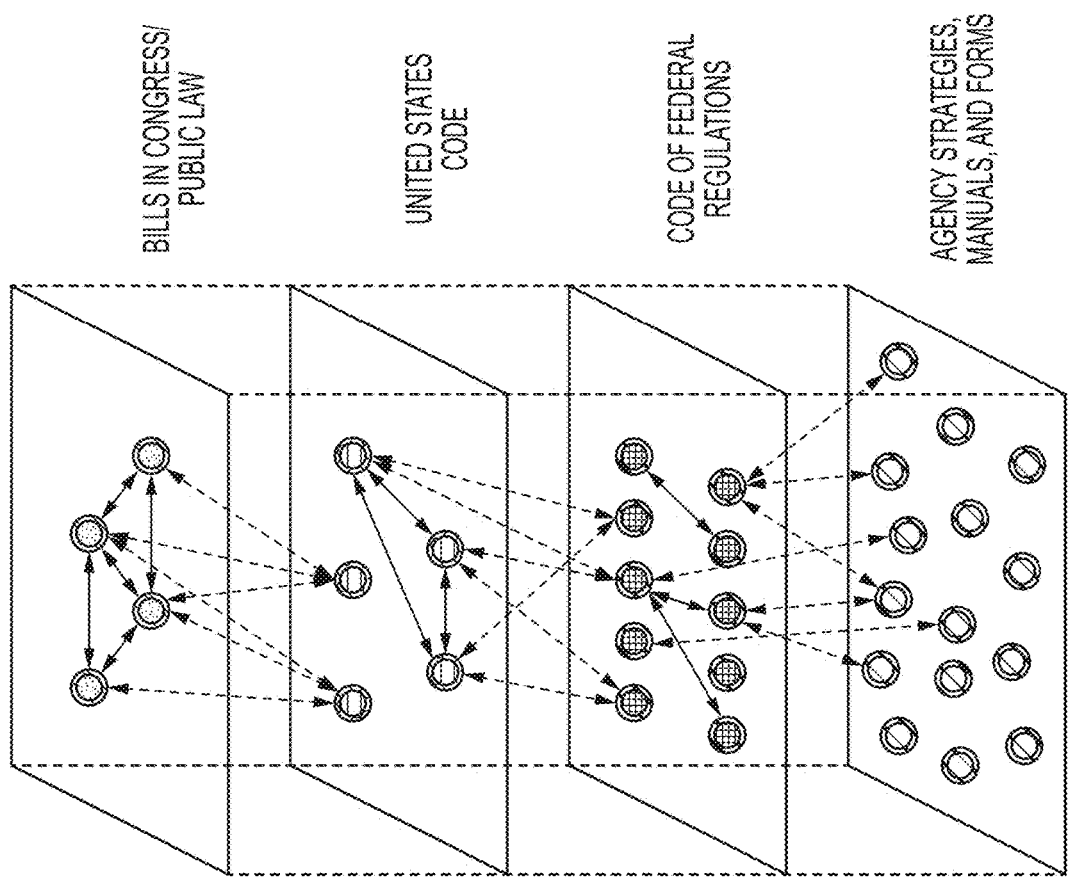
FIG. 1 illustrates an example of a simplified legal citation network.

Laws, regulations, and policies that govern federal agencies are so intertwined and interdependent that the operation impact of changes or additions to them are often poorly understood or appreciated at both the legislative and operational stage. Applicants discovered that network models can provide agencies a more objective and transparent view of their LRPs and be used to study potential policy impacts on agencies. More specifically, Applicants have developed a legal path analysis system that can leverage network models of legal text to efficiently evaluate the impact of legislation on U.S. federal government agencies. More specifically, the system and methods disclosed herein can help detect impactful laws, regulations, and policies before they are implemented, can automate traceability of legal requirements, and/or can help identify superseded policies for government agencies.

As stated above, searching the immense and ever expanding amounts of LRPs for LRPs that directly impact a government agency is computationally inefficient. However, Applicants discovered that the legal system can be modeled as a network with the legal text (e.g., titles, chapters, sections, and clauses of the United States Code (U.S.C.)) and citations within corresponding to the entities (or nodes) and relationships (or edges), respectively. Using such an approach, the interconnected set of bills, public laws, rules, statutes, U.S.C., Code of Federal Regulations (C.F.R.), etc. can be treated as a network to explore the chain of changes that result from new legislation. This legal network can be stored as a graphing database.

In network science, this can be referred to as path analysis. Such a path can be defined as a sequence of edges that connect a sequence of nodes. This path analysis can assess, given the paths of nodes and edges linked from a legislative act, the agencies that are associated with the legislative act to infer potential impact of the legislation on the agency. To perform such an analysis, Applicants developed a database driven web application to model the citation network. This web application can perform automated download, citation extraction, and ingestion for each of the collective legal corpora. Furthermore, the web-based application can explore the legal network based on topic or structure of the legal text, as well as perform path analysis.

In the context of the present application, the nodes can be legal texts, sections of legal texts, government agencies, and/or legal texts of government agencies. Governmental agencies can be nodes connected to other legal text nodes because the agency may have created the corresponding legal text or the legal text may govern the operation of the agency. Legal texts include, but are not limited to, public laws, Congressional legislation (e.g., federal bills), the United States Code (U.S.C.), the Code of Federal Regulations (C.F.R), Federal Rules, and Executive Orders (including presidential directives). These legal texts can be obtained from the government publishing office website. A list of government agencies can be combined from USA.gov, FederalRegulations.gov, and C.F.R. Chapter Headings.

In the context of the present application, the edges can be citations. In addition, citations to agencies can be created when LRPs mentioned agencies or cited parts of the LRPs that an agency regulation depends on.

Creating the Legal Citation Network

The citation network of laws and regulations can be a representation or model of the legal system. Although the legal system is vast and densely interconnected, the citation network can represent the relationships between parts of the law, including the relationship that laws have to regulations. Further, by relating parts of the C.F.R. and U.S.C. to agencies, the relationships that laws have to the agencies that implement them can be determined. These relationships can be used to understand the impact that new laws have on agencies, and can help to identify which regulations will need to be updated due to a new law. For example, the citation network can utilize citation-based relationships to associate parts of the C.F.R., the U.S.C., and public laws or federal bills to federal agencies.

An example of an oversimplified legal citation network is illustrated in FIG. 1. The various relationships between bills in Congress, public laws, the U.S.C., the C.F.R., and agency strategies, manuals, and forms are shown in FIG. 1. The circles represent various nodes for each section of the given legal texts on the right. The dotted lines represent a citation from one section of a legal text to another section of a different legal text and the solid lines represent a citation from one section of a legal text to another section of the same legal text. Accordingly, the citation network can provide visualization for the various interactions between legal texts.

Creating Nodes

In some embodiments, nodes can be created in the citation network for at least one of: (1) the federal agencies; (2) the Code of Federal Regulations; (3) the United States Code; (4) federal public laws; (5) federal bills; (6) Federal Rules; and (7) Executive Orders. In some embodiments, a node for at least one federal agency can be created in the citation network.

In some embodiments, a node can be created for each federal agency of the U.S. federal government. A list of government agencies can be compiled from USA.gov, FederalRegulations.gov, and C.F.R. Chapter Headings. In some embodiments, a node can be created for an agency's policies and regulations (e.g., agency strategies, manuals, and forms). In such a case, an edge can be created between an agency node and the agency's policy and regulation node.

In some embodiments, a node for at least one title of the United States Code can be created in the citation network. In some embodiments, a node for each title of the United States Code can be created in the citation network. In some embodiments, a node can be created for a subsection of the U.S.C. other than title (e.g., subtitle, chapter, subchapter, part, subpart, section subsection, paragraph, subparagraph, clause, subclause, item, and/or subitem). In such a case that a node is created for a subsection of another section of the U.S.C., an edge can be created between the section node and its subsection node. For example, if a title node and a subtitle node of the U.S.C. is created, an edge between the two can also be created. In addition, if a chapter node, subchapter node, and part node are created, an edge between the chapter node and the subchapter node and an edge between the subchapter node and the part node can also be created.

In some embodiments, a node for at least one title of the C.F.R. can be created in the citation network. In some embodiments, a node for each title of the C.F.R. can be created in the citation network. In some embodiments, a node can be created for a subsection of the C.F.R. other than title (e.g., subtitle, chapter, subchapter, part, subpart, section subsection, paragraph, subparagraph, clause, subclause, item, and/or subitem). In such a case that a node is created for a subsection of another section of the C.F.R., an edge can be created between the section node and its subsection node.

In some embodiments, a node for at least one federal public law can be created in the citation network. In some embodiments, a node for each federal public law can be created in the citation network. In some embodiments, a node can be created for a subsection of the federal public law. In such a case that a node is created for a subsection of the federal public law, an edge can be created between a section of the federal public law node and its subsection node.

In some embodiments, a node for at least one federal bill can be created in the citation network. In some embodiments, a node for each federal bill can be created in the citation network. In some embodiments, a node can be created for a subsection of the federal bill. In such a case that a node is created for a subsection of the federal bill, an edge can be created between a section of the federal bill node and its subsection node.

Creating Edges

In order to create additional edges in the citation network, the citations between the various legal texts needs to be determined. For example, a portion of Title 35 of the U.S.C. may cite to title 7 of the C.F.R. As such, an edge between the title 35 U.S.C. node and title 7 C.F.R. node can be created.

In some embodiments, citations to the U.S.C. in the C.F.R., citations to the public laws in the C.F.R., citations to Congressional legislation (e.g., federal bills) in the C.F.R., citations to Federal Rules in the C.F.R., and/or citations to Executive Orders in the C.F.R. can be determined. In some embodiments, citations to public laws in the U.S.C., citations to Congressional legislation (e.g., federal bills) in the U.S.C., citations to the C.F.R. in the U.S.C., citations to Federal Rules in the U.S.C., and/or citations to Executive Orders in the U.S.C. can be determined. In some embodiments, citations to Congressional legislation in the public laws, citations to the U.S.C. in the public laws, citations to the C.F.R. in the public laws, citations to Federal Rules in the public laws, and/or citations to Executive Orders in the public laws can be determined. In some embodiments, citations to public laws in Congressional legislation, citations to the U.S.C. in Congressional legislation, citations to the C.F.R. in Congressional legislation, citations to Federal Rules in Congressional legislation, and/or citations to Executive Orders in Congressional legislation can be determined. In some embodiments, citations to public laws in the Federal Rules, citations to Congressional legislation in the Federal Rules, citations to the U.S.C. in the Federal Rules, citations to the C.F.R. in the Federal Rules, and/or citations to Executive Orders in the Federal Rules can be determined. In some embodiments, citations to public laws in Executive Orders, citations to Congressional legislation in Executive Orders, citations to the U.S.C. in Executive Orders, citations to the C.F.R. in Executive Orders, and/or citations to the Federal Rules in Executive Orders can be determined.

To determine the citations between the various legal texts, a citation parsing algorithm can be applied. The citation parsing algorithm can use regex patterns universally-applicable to all ingested documents and added support to ingest corpora based on their independent structures and file formats. Essentially, for every citation in a document, the citation is recorded in the section that the citation was found as well as the sections that the document is citing. These citations can form the edges between the nodes (sections of the documents).

The process for parsing each legal document can rely upon two primary factors: (1) the file format of the document; and (2) the metadata structure of the document. For example, U.S.C. documents have a defined set of levels at which freeform textual content resides, ranging from the Title (the entire document) to its Items (the lowest possible level of the document, second only to Subitems residing in bulleted lists). All the constituent parts of a Title, including the Title itself, may contain sub-component elements as well (e.g., Subtitle, Subchapter, Subitem, etc.). Knowing this set of possible components, Applicants developed an algorithm which extracted the citations from the legal text at each hierarchical level and encoded it into a list of documents. The U.S.C. and C.F.R. corpora are available from the Government Publishing Office in Extensible Markup Language ("XML"). The Applicants utilized the hierarchical encoding of the U.S.C. and C.F.R. in XML tags associated with each level, normalized the consistency of the set of tags across the U.S.C. corpora, and read the observed tags into a list of documents. Using recursion, Applicants programmatically identified whether and in what sequential order those elements appears in each ingested document, tracing the parent-child relations of those elements so that the structural hierarchy can be agnostic and automatically determined per document rather than per corpus. As such, in cases where certain elements are interchangeable across a corpus, this can be useful. For example, most U.S.C. documents have Parts which precede Chapters, but, in some cases such as Title 38, the Chapters may instead precede the Parts.

This process also allowed Applicants to accurately parse the C.F.R., which has a different set of XML tags to correspond to its document structure levels and does not label any levels below the Section level of the structure (although lower levels do formally exist in legislative authoring). Applicants have also determined the repeatability of this process to Federal Congressional Bills, public laws, Executive Orders, Federal Rules, and internal policy documents for various federal agencies.

For documents where XML-labeled metadata is unavailable such as text files, PDFs, or XML documents without structured organization, Applicants were able to parse text at the highest level of the document, such as the Title, allowing Applicants to produce accurate, if sometimes imprecise, source-target reference data.

As the algorithm/program identifies a new level in a document, it can record its current position within the document for source-labeling purposes (e.g., 8 U.S.C. 1, followed by 8 U.S.C. 2, etc.). This process can parse each document ingested into the algorithm/program by preserving and identifying its sequential ordering. It then can extract the text relevant to that specific element without associating the text of any higher- or lower-level elements that have been tagged by XML.

With this approach, the text specific of the lowest-level elements of any document can be recalled and associate that text with higher-level parents as needed to reproduce as little or as much of the document as desired. For citation extraction, the lowest-levels available can be used to maximize the precision of the policy reference system, and roll up to a higher-level in post-processing when consistency across corpora or comparison to other studies is the goal.

The text of each level can be scanned with an extensive set of regular expressions tailored to identify the most common formatting patterns that are used to cite legal documents. This can allow the program to identify citations to various corpora, thereby maximizing the reference list even before a citable corpus is prepared for ingestion. In addition, the use of a simple flagging system can also limit the extracted references to any specific subset of corpora deemed useful. As part of the regular expression parsing, references can be included that use more "natural language" formatting. Next, the data extracted can then be reformatted into consistent labeling patterns. For example, "8 U.S.C. 5" can also be referenced as "Section 5 of Title 8 of the U.S.C.", but however the program extracts it from text, it can store it consistently as "8 U.S.C. 5". This can help prevent data duplication and can further be enhanced by a very minor typographical-correction process included in the labeling stage.

The resulting data set can be a legal citation network inclusive of the source corpora ingested and the cited corpora which has both written regular expression to identify and have chosen to store. The source of a relationship in the resulting network can be the lowest-level parsed within each document, the one for which textual content has been extracted. The target (or recipient or tail-end) of the relationship can be the actual reference made by the text, which can range from the highest- to the lowest-levels of a legal document. Relationships can be weighted by the frequency with which a source makes reference to a target, such that multiple references from one document to another suggest a strong dependency between them. This can be most notable when the labels are "rolled up" to higher levels and the relationships between documents at the Title or Section levels can be measured.

In response to determining a citation from one legal text to another, an edge can be created between at least two nodes of the legal texts. For example, if a node is created for a title of the U.S.C. and in that section of the U.S.C. that corresponds to the title there is a citation to a title of the C.F.R., an edge can be created between the title node of the U.S.C. and the title node of the cited C.F.R. In addition, if a node is created for a subtitle of the U.S.C. and in that section of the U.S.C. that corresponds to the subtitle there is a citation to a subsection of the C.F.R., an edge can be created between the subtitle node of the U.S.C. and the subsection node of the C.F.R. As such, whenever a section of a first legal document cites to a section of a second legal document, an edge can be created between the node that corresponds to the section of the first legal document and the node that corresponds to the section of the second legal document. This creation of edges between nodes can be applied to all node titles, subtitles, chapters, subchapter, part, subpart, section subsection, paragraph, subparagraph, clause, subclause, item, and/or subitem of the various legal documents. Accordingly, the citation network can map the various interactions between the various legal texts.

To construct a complete network of the legal system, the most up to date relevant corpora of legal documents can be incorporated into the network. Accordingly, the system disclosed herein can automatically ingest the most updated revision of the U.S.C., C.F.R., public laws, Congressional bills, Executive Orders, Federal Rules, and other legal texts. The majority of the federal legal corpora is available online in machine-readable format, along with document metadata in various levels of specificity. For example, current and some historic bills, public laws, status, the USC, Federal Rules, and many other official documents are available in bulk from the Government publishing Office's FDSys site.

Figure 2:
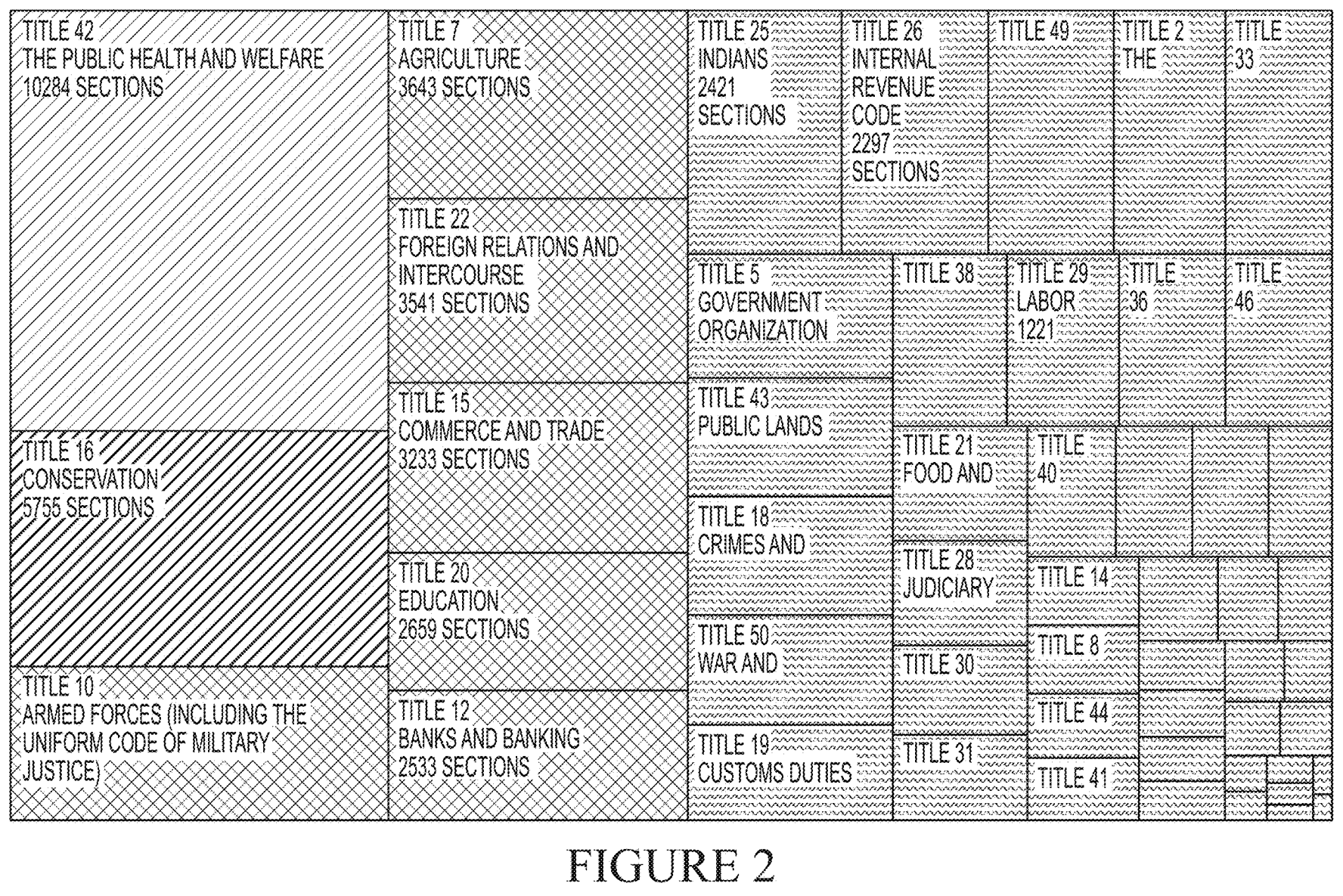
Figure 3:
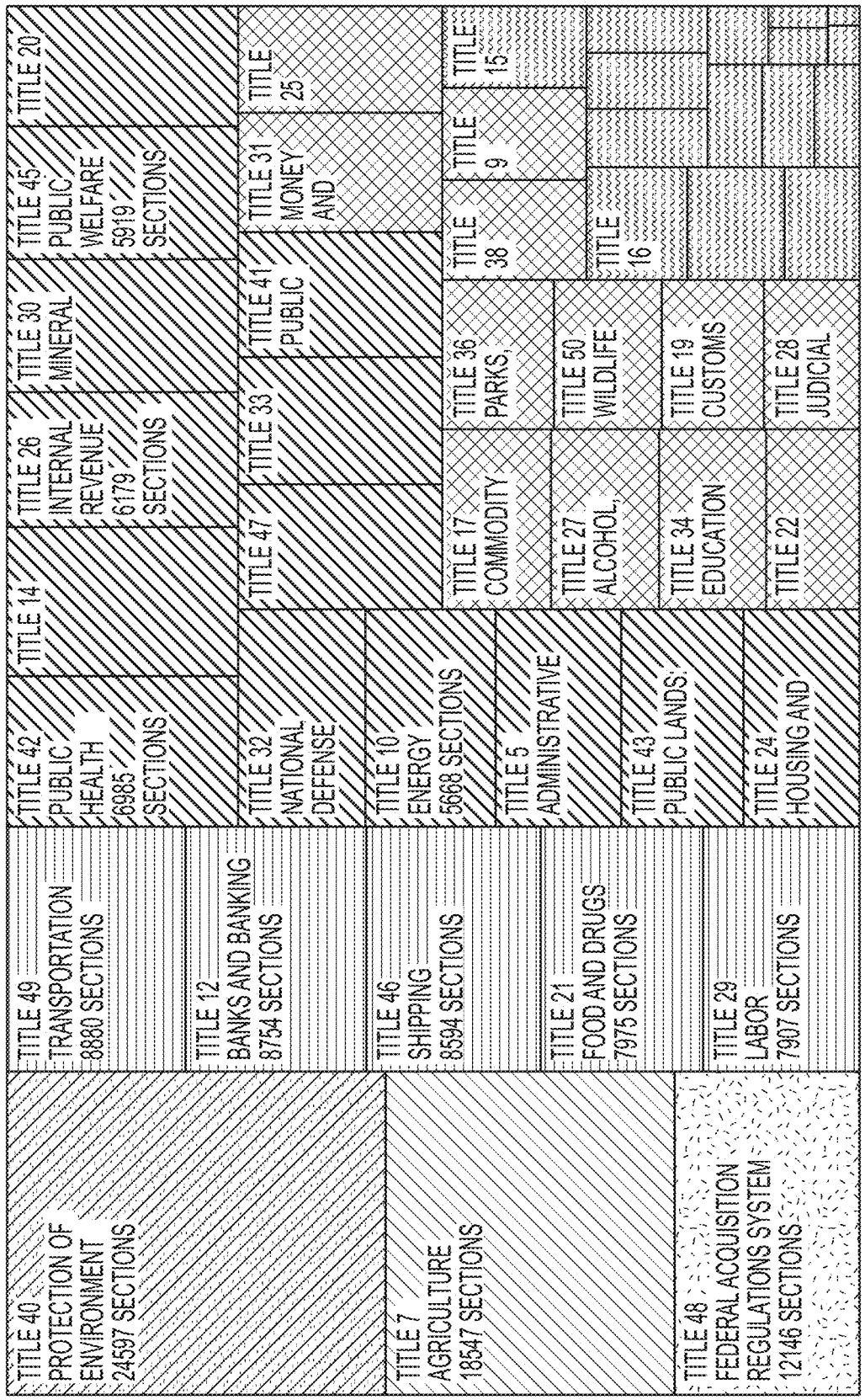
FIG. 3 illustrates a heatmap of the C.F.R.
Figure 4:
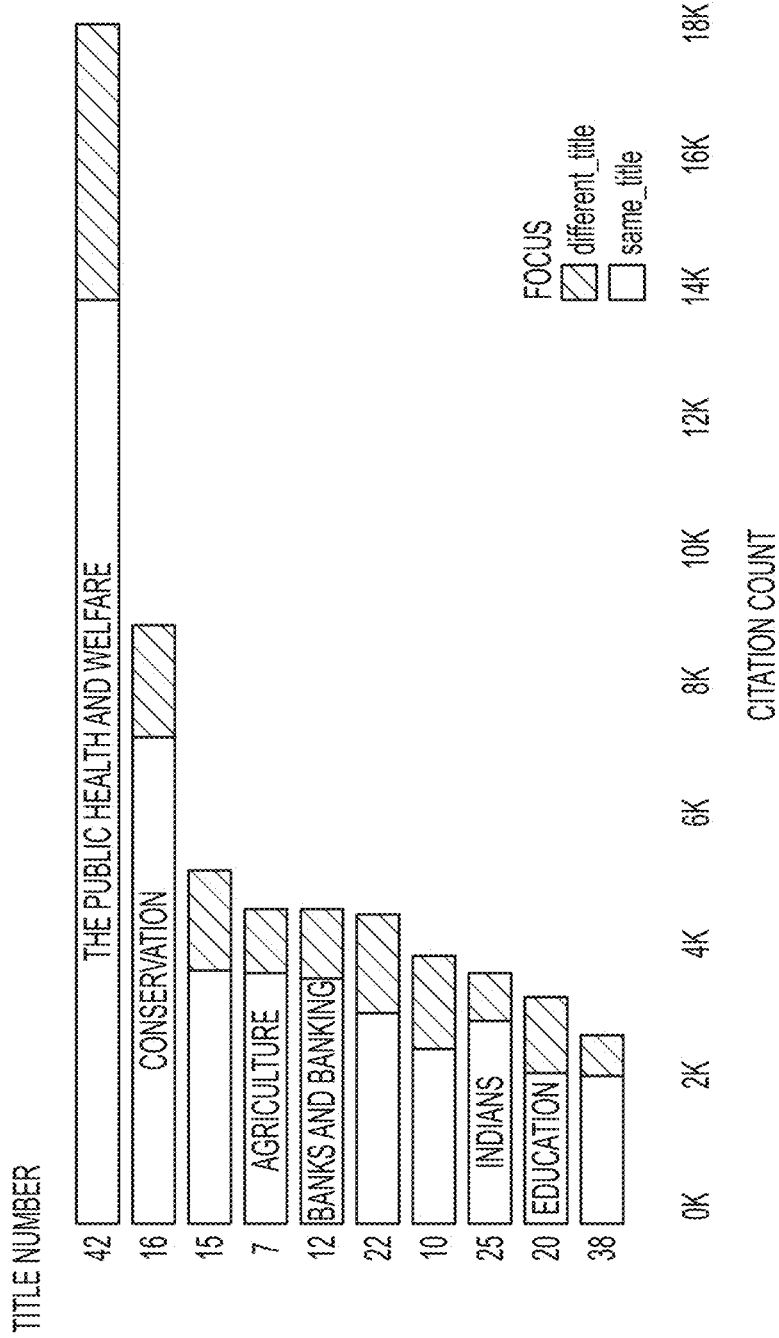
FIG. 4 illustrates the amount of internal and external citations for various titles of the U.S.C.
Figure 5:
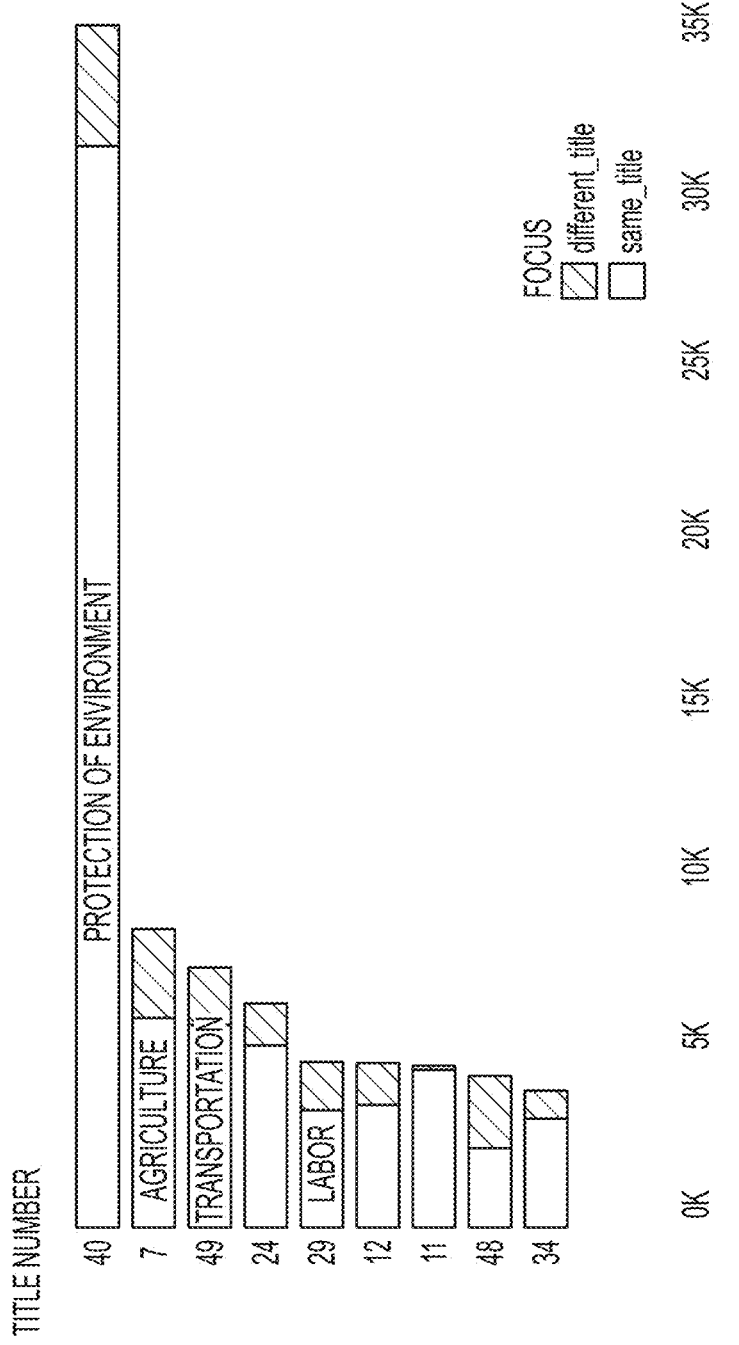
FIG. 5 illustrates the amount of internal and external citations for various titles of the C.F.R.
Figure 6:
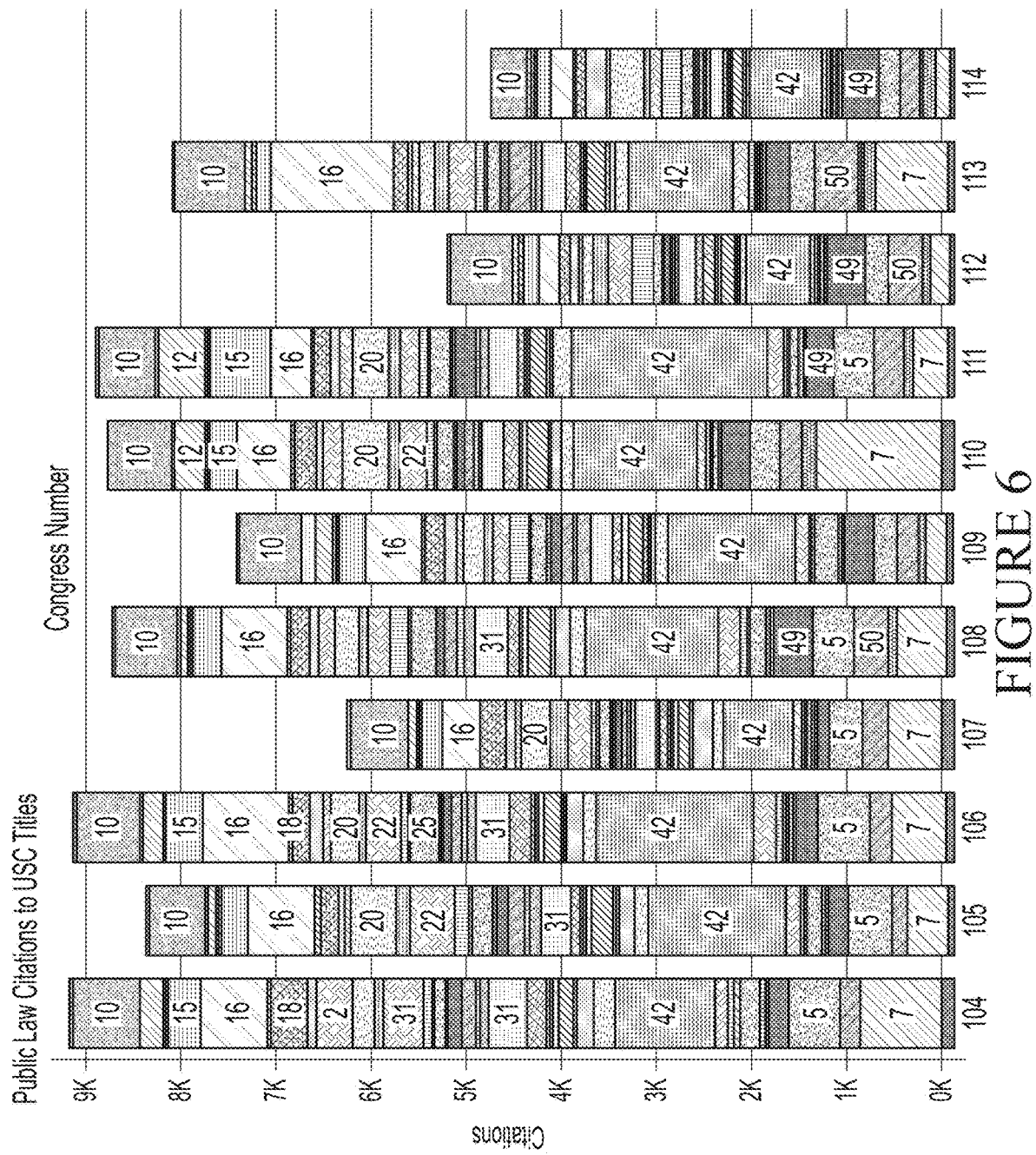
FIG. 6 illustrates the amount of public law citations to U.S.C. titles for the various Congresses.
Figure 7:
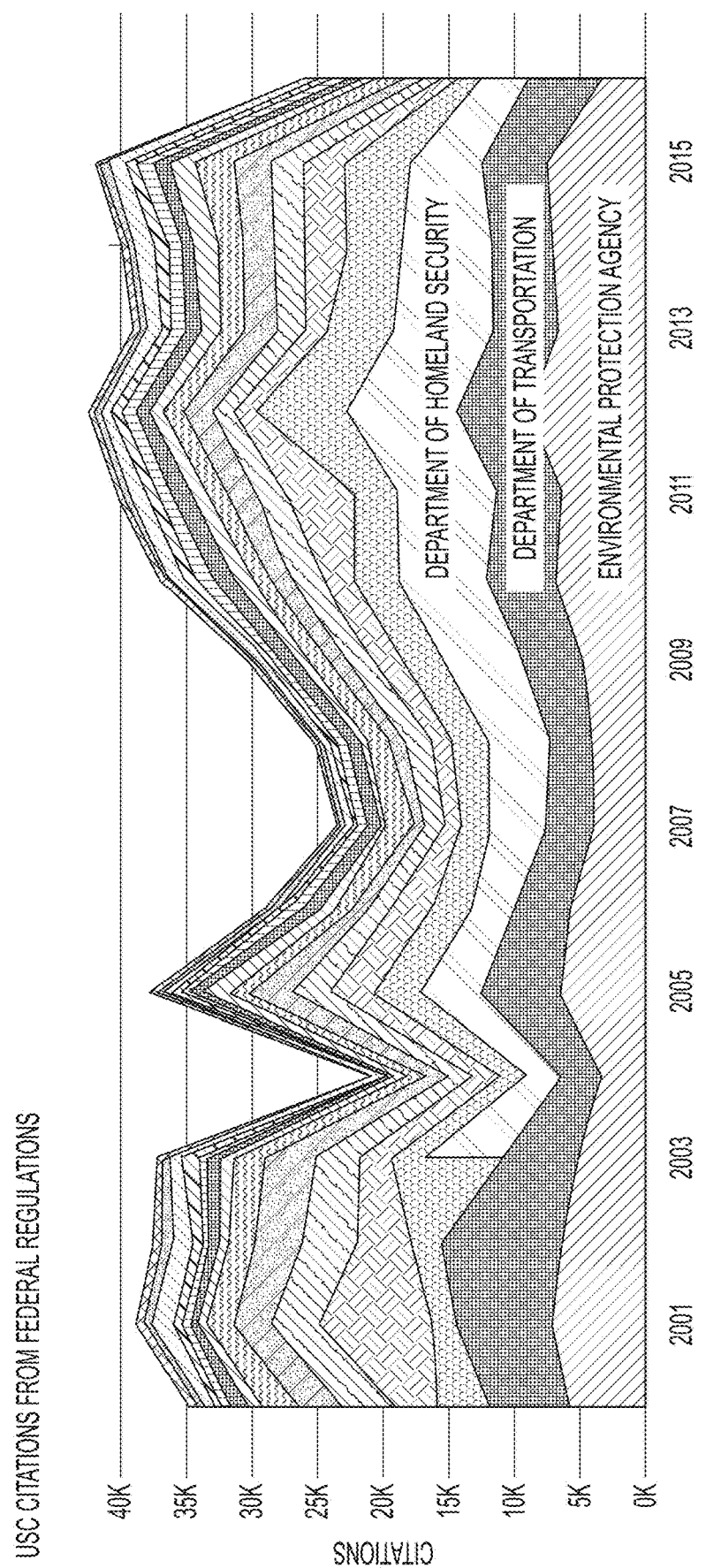
FIG. 7 illustrates the amount of U.S.C. citations from Federal Regulations.

As stated above, the legal system is vast and opaque. Specifically, the law is dynamic, nonlinear, interrelated, and constantly growing. For example, both the U.S.C and C.F.R. contain thousands upon thousands of words. In addition, the individual sections of the U.S.C. and the C.F.R. are gigantic as well. FIGS. 2 and 3 provide a heatmap of various titles of the U.S.C. and C.F.R., respectively, wherein the size of the box for each title is consistent with the size of the corresponding section of the U.S.C. and C.F.R. for each title. Furthermore, there is an extremely large amount of both internal and external citations in the U.S.C. and the C.F.R. FIGS. 4 and 5 illustrate the amount of internal and external citations for the U.S.C. and C.F.R., respectively, with respect to various titles of the U.S.C. and C.F.R. In addition, FIG. 6 provides an illustration on how the laws continuously adapt over time. Specifically, FIG. 6 illustrates the amount of public law citations to U.S.C. titles for the various Congresses. FIG. 7 illustrates the amount of U.S.C. citations from Federal Regulations.

As can be seen from these Figures, the amount of text and various cross citations between the legal documents is enormous. Searching these vast and ever changing bodies of legal text is computationally inefficient. However, Applicants' citation network of nodes and edges for the various legal texts can be handled by a computer more efficiently.

Edges between nodes of federal agencies or federal agencies' policies and regulations (e.g., operating manuals) and other nodes for legal texts can also be created. In some embodiments, sections (titles, subtitles, etc.) of the U.S.C. and/or C.F.R. that are relevant to the federal agencies can be determined. There are several ways to attempt to identify which laws are relevant to an agency. One way can be to look at the title and chapter headings of the C.F.R., which are named based on the agency they pertain to. The Applicants developed a mapping between the agencies named in the C.F.R. titles and the agency names that appear in the Federal Register. Another way to identify which agencies are relevant to which parts of the U.S.C. and C.F.R. can be to look at the Federal Register. The Federal Register contains a collection of rules which cite the parts of the C.F.R. that they are amending, as well as the part of the U.S.C. that they are implementing. The Applicants collected and extracted citations between the U.S.C. and the C.F.R. sections mentioned by each document in the Federal Register, and recorded the network structure. Each rule in the Federal Register can also be connected to the agency that issued the rule. This network structure could provide a representation of the interconnections between agencies, the U.S.C., and the C.F.R. In addition, the Public Laws and Bills in Congress both cite parts of the U.S.C in their implementation, and can therefore be connected indirectly to the agencies that deal with the same parts of the U.S.C. and C.F.R. that they do. Executive Orders, too, can cite parts of the C.F.R., and can therefore be connected to relevant agencies. Agencies can also be connected to all documents that name them directly.

Figure 8:
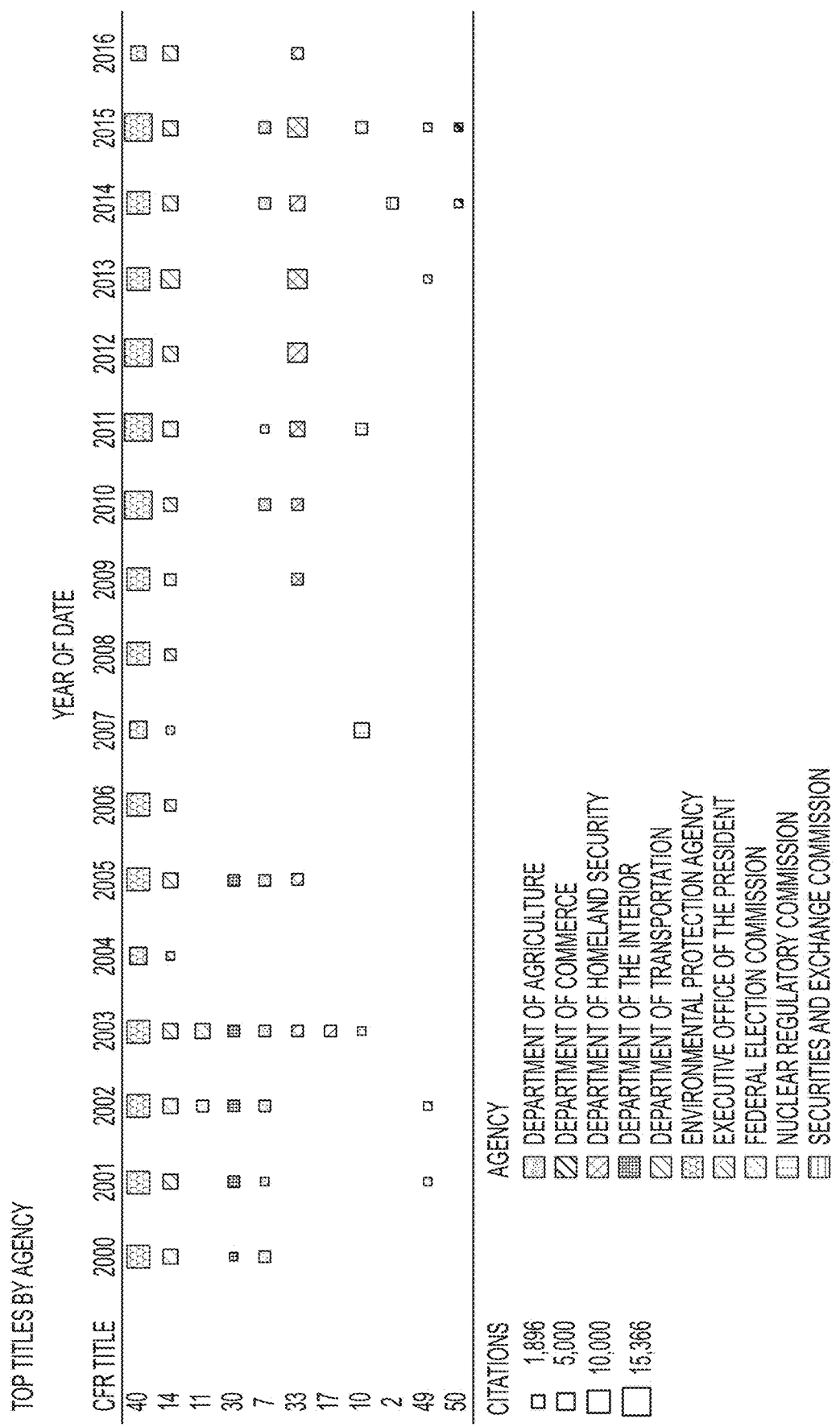
FIG. 8 illustrates the amount of citations for various C.F.R. titles for various federal agencies.
Figure 9B:
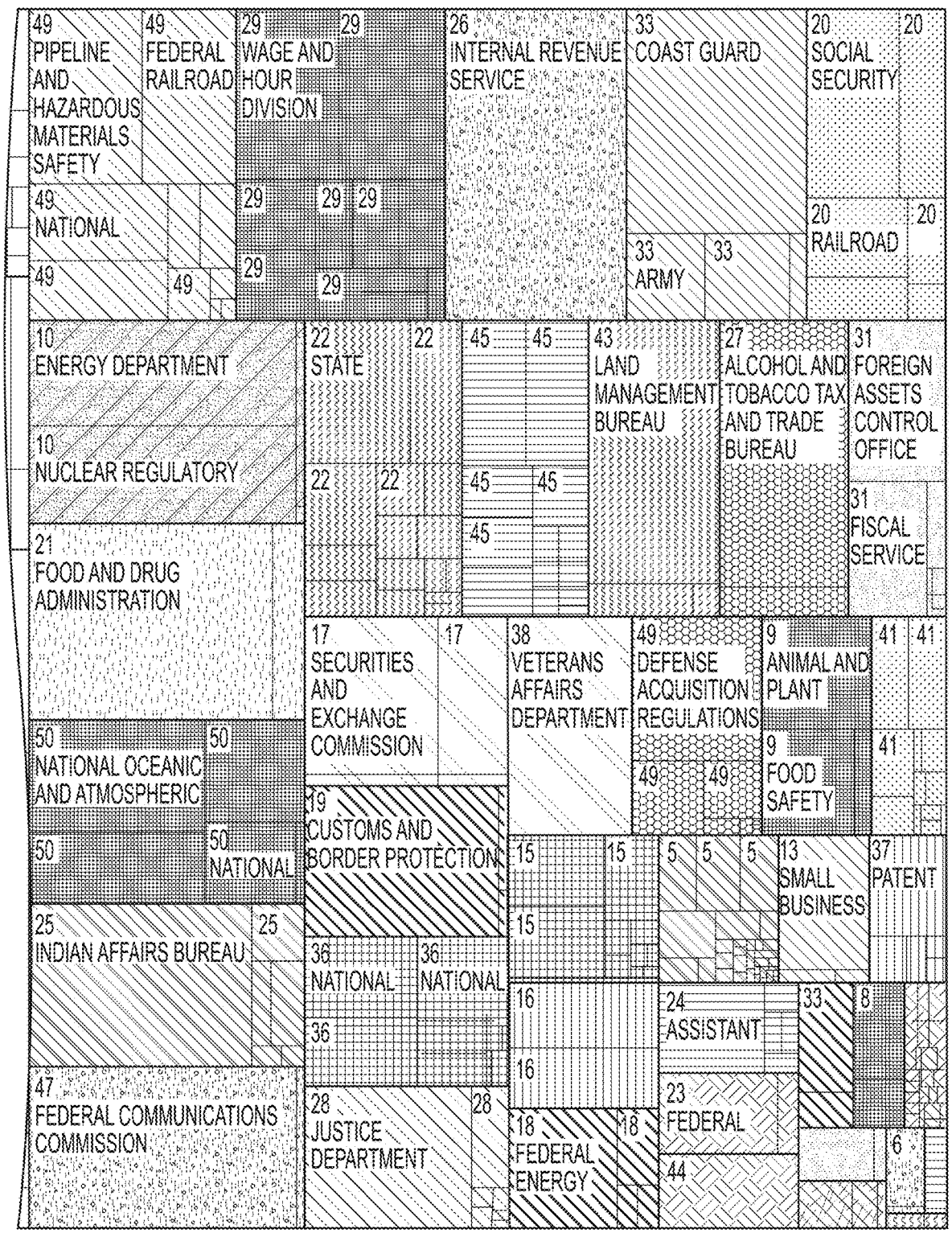

FIG. 8 illustrates the amount of citations for various C.F.R. titles for various federal agencies. In addition, FIGS. 9A-9B illustrate a heatmap for various federal agencies' C.F.R. responsibilities, wherein the pattern of each box is for a single title of the C.F.R. and the size of each box is consistent with the size of the corresponding section of the title that the federal agency is responsible for.

Thus, the Applicants developed a system that can build such a network which could be queried in such a way as to return all the connections between a document and an agency. This system can return the number of connections between a public law, the U.S.C., the C.F.R., and an agency, for instance. To connect a public law to an agency, for example, there should exist a "path", or series of connections, between an agency, the C.F.R., the U.S.C., and the public law. The network can be queried in such a way as to return all "paths" between any two nodes.

The intuition of this approach can be checked by examining the parts of the U.S.C. that are relevant to each agency. In Table 1 below, a set of agencies, C.F.R. titles, and U.S.C. titles illustrate the topical relationship between the U.S.C. and C.F.R. In this fashion, agencies can be associated with the C.F.R. and U.S.C. From there, any new public laws or bills that cite a part of the U.S.C. can be associated with an agency.

TABLE 1

| Agency | CFR Titles | USC Titles |
|---|---|---|
| CENTERS FOR MEDICARE AND MEDICAID SERVICES | 42 | 26, 25, 32, 42, 5, 31, 38, 10, 21, 20, 43, 41, 8, 18, 15, 29, 2, 45 |
| ENVIRONMENTAL PROTECTION AGENCY | 40, 5, 2 | 42, 15, 21, 7, 5, 18, 16, 26, 20, 40, 43, 31, 6, 29, 28, 33, 50, 49, 25, 48, 41, 23, 19, 1, 30, 44, 46, 14 |

TABLE 1-continued

| Agency | CFR Titles | USC Titles |
| --- | --- | --- |
| CENTRAL INTELLIGENCE AGENCY | 32 | 50, 5, 42, 29, 18, 20, 21 |
| INTERNAL REVENUE SERVICE | 26 | 15, 42, 19, 5, 50, 22, 49, 6, 31, 37, 2, 29, 11, 43, 8, 38, 12, 30, 46, 41, 45, 35, 28, 10, 7, 18, 26, 47, 33, 25, 48, 13, 16, 21, 20 |
| PATENT AND TRADEMARK OFFICE | 37 | 35, 15, 28, 31, 18, 17, 5, 44, 26, 20, 42 |

An example of a citation network can be shown as follows: An edge can be created between an agency node and the sections of the C.F.R. that belong to that agency. For the C.F.R. sections, various sections of the U.S.C. that it cites can then be identified and an edge can be created between the U.S.C. sections and any agency connected to the C.F.R. sections. Next, for the various U.S.C. sections, public laws that it cites can be identified and an edge between the public law and any agency connected to the U.S.C. sections can be created.

The impact to a given agency can be quantified using various metrics, such as the number of sections of the laws affecting the agency that are amended or modified as a result of the public law. These documents can be organized into a hierarchical citation network and displayed in a browser using a network visualization library. Laws and agencies can be highlighted, and colors can be used to differentiate the types of legal corpora and the interaction between them. This network can provide an indication of the path of implementation of a given law by agencies.

Using the Legal Citation Network

The Applicants created a web-based application, referred to as PolicyNet, that can allow users to query the citation network in several ways. Most significantly, the citation network can query documents based on their proximity to an agency. For example, a legal analyst can use PolicyNet to identify public laws, Executive Orders, and Bills in Congress that are likely to be relevant and impactful to an agency. An analyst can also use search tools in PolicyNet to search for documents by topic, and identify the "local network" of any document in the network. This can allow researchers to identify other agencies that a given document may be connected to.

The citation network can also be used for exploring the network of laws, regulations, and policies, including a graph-based search and a neighborhood view of any node in the network. In addition, the system and citation network can handle queries. For example, if a user asks the system to analyze the impact of a law on a specific agency, the system will query for that law's node. If that law is not already in the citation network, then it will be added to the citation network. If the law is in the citation network, then the system can provide the parts of the U.S.C. that the law cites and the links to the various other legal texts that are connected to that node via edges. Essentially, the system can provide all paths between that law's node and the agency's node. In addition, the system can provide all the parts of the laws and regulations that are going to be amended by this law or that are based on this law.

Furthermore, in the systems disclosed herein, users can enter a Public Law and see all the laws, regulations, and policies that have cited the law. The network can also be organized hierarchically, such that the provenance of changes is represented. As such, views of the data can demonstrate the magnitude of changes that a given law can create, and provide an indication of the agencies and policies that are affected by the law. The systems and methods disclosed herein, backed by a database of all public laws and regulations, can provide a generalized method to answer empirical questions about regulatory impact. Furthermore, the system and methods disclosed herein can identify public laws or federal regulations that are relevant to federal agencies and create notifications for the agencies and/or users. In addition, the system can answer the following questions: (1) Which laws and regulations discuss a given topic; (2) What is the regulatory implementation of a law; (3) What is the legal precedence for a regulation; and (4) Which bills, laws, orders, and regulations impact an agency.

Figure 18:
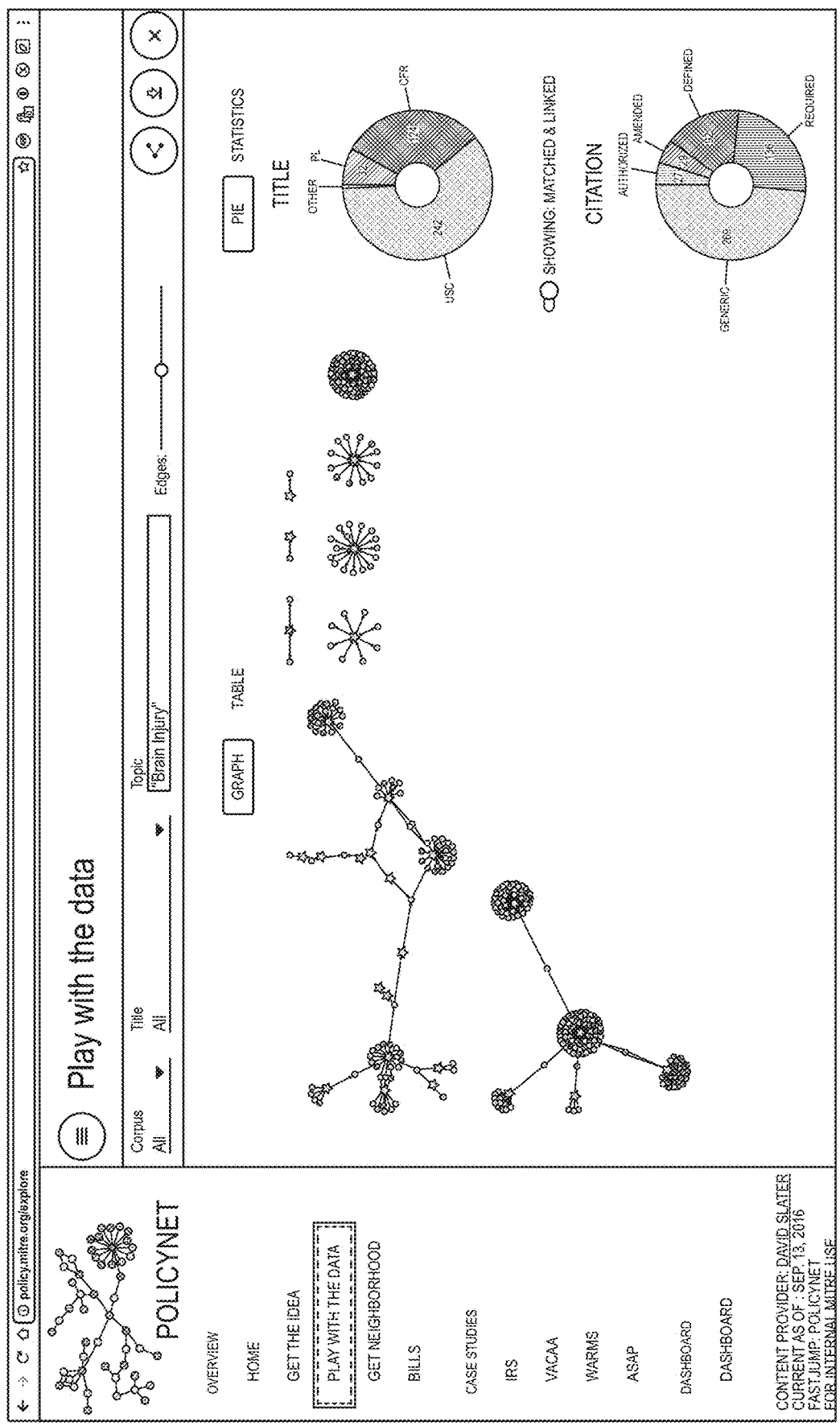
FIG. 18 illustrates an example user interface of the web-based application disclosed herein.

The system disclosed herein can be in the form of a web-based application. An example of the web-based application is shown in FIG. 18. FIG. 18 displays a web page with a 'toolbar' at the top, a 'side-navigator' on the left, and a 'main view' in the middle of the page. The 'toolbar' has a search bar, which allows the user to specify a topic of interest, and an 'edge slider', which allows the user to select the number of network connections to return in the search results. The 'side navigator' can provide links to other features of the web app, including the 'local network search' and the 'Agency Early Warning System'. The 'main view' is displaying the search results, a set of networks which correspond to different parts of the law dealing with the query 'brain injury'. The top pie charts show the types of documents appearing in the network, including the C.F.R., U.S.C., and others. The bottom pie chart shows the types of citations that appear in the network, including 'amended', 'defined', 'required', and 'authorized'. The user can also switch to a table view of this data, which lists the names of each document displayed, as well as other characteristics about the data.

Figure 10:
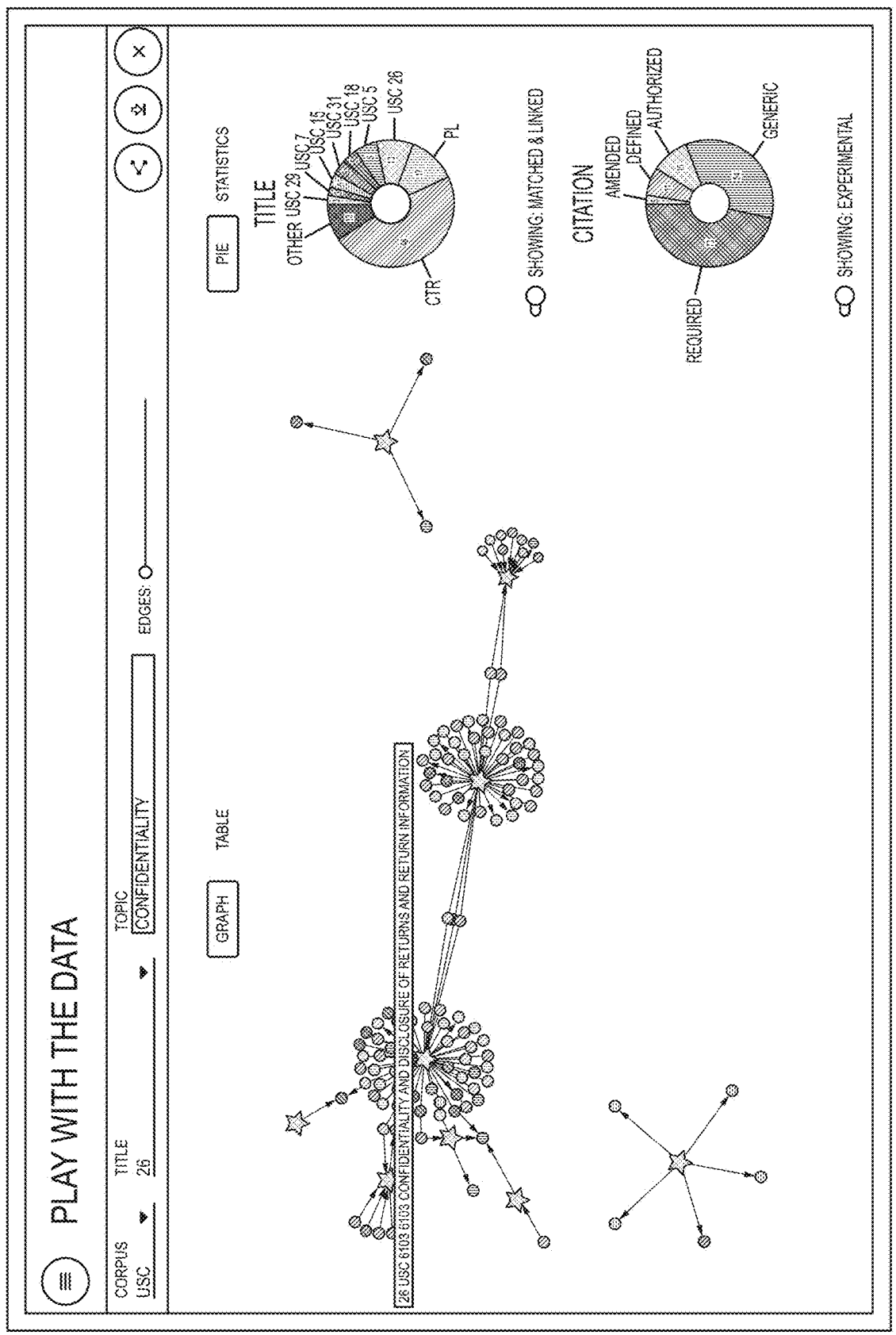
FIG. 10 illustrates a user interface where a search was performed for looking at parts of the IRS Code that deal with confidentiality of information.

The system can allow a user to search the legal citation network by corpus (and section of corpus) and/or keyword and can identify which laws, regulations, and policies are relevant to the search. FIG. 10 illustrates a user interface where a search was performed for looking at parts of the IRS Code that deal with confidentiality of information. As can be seen from the user interface, the system identified 26 U.S.C. 6103 as a good candidate for investigation. In addition, the system can identify which parts of the citation network deal with this topic, and what the types of relationships are between the various nodes in the portion of the citation network shown in FIG. 10 for example.

Figure 11:
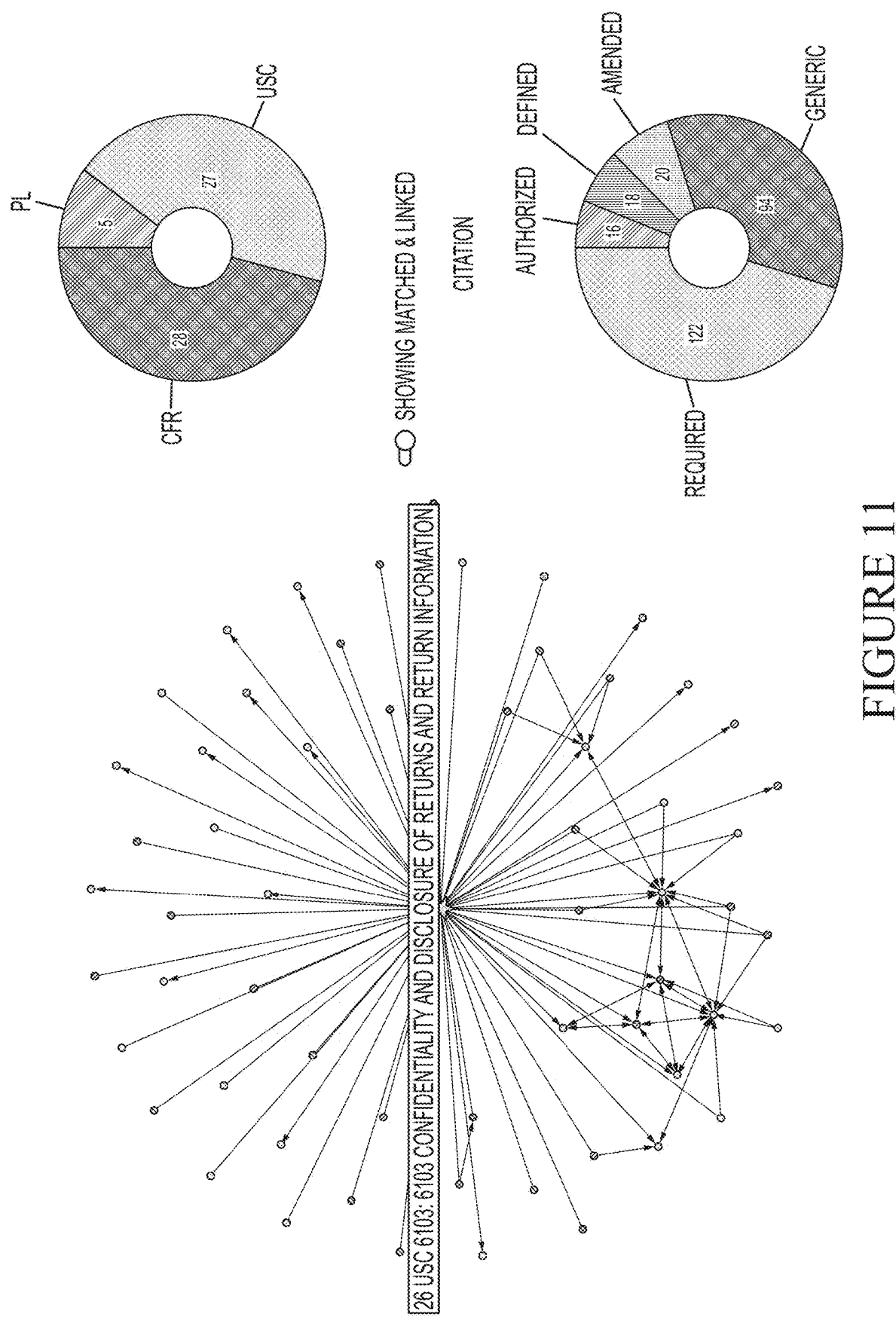
FIG. 11 illustrates a user interface where a local neighborhood around a particular is displayed.
Figure 12:
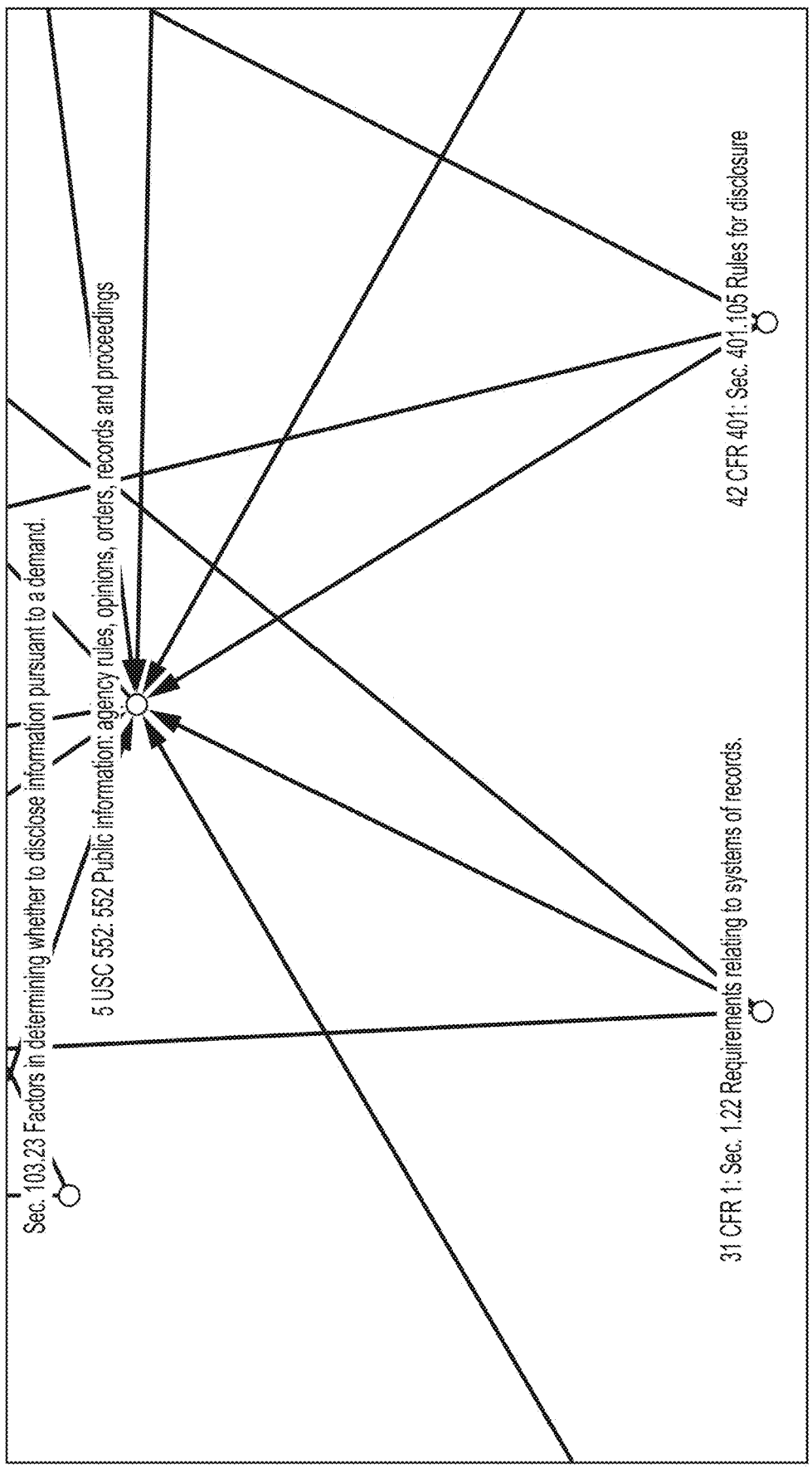
FIG. 12 illustrates the zoomed in interface of FIG. 11.

The system can also allow a user to search the local neighborhood around a particular law, regulation, or policy to identify its legal basis and implementation. FIG. 11 illustrates a user interface where a local neighborhood around a particular is displayed. The system can identify the types of laws, regulations, and policies that cite or are cited by the particular law, regulation, or policy. As shown in FIG. 11, six public laws, 27 U.S.C. sections, and 28 C.F.R. sections were found related to the given law. In addition, the user interface can allow a user to drill down into the neighborhood to identify which other laws, regulations, or policies are citing or are cited by the particular law of interest. FIG. 12 illustrates such a drill down. Notice how the C.F.R. nodes in FIG. 12 cite the U.S.C. nodes.

The system can also perform an impact analysis of a new bill in Congress. When a bill is in Congress, it cites the existing law it will amend. Agencies often have to analyze the potential impact of a bill or new law on their own regulations and policies. The system disclosed herein can allow a user to search a Bill in Congress and identify the changes the bill will make to existing law. Such changes can be presented in the form of a redlined version. This can be achieved by querying the text of the bill, and extracting the citations to the U.S.C. From there, an algorithm is used to find, replace, and amend the contents of the relevant U.S.C. sections with the new bill text.

The system can also identify relevant laws, regulations, and policies for a given agency or determine each federal agency associated with each law, regulation, and/or policy. Given the thousands of new laws, regulations, and policies passed each year, it is difficult to identify which ones are relevant to a given federal agency. As such, the system disclosed herein can use the legal citation network to determine the various dependencies between agency rules and regulations and the laws that they are based on. As such, new bills, public laws, Executive Orders, etc. that reference agency-relevant parts of the U.S.C. or C.F.R. can be flagged as being "relevant" to such agencies if they are closely connected to them in the network. In addition, if a law, regulations, or policy mentions an agency by name, it can also be determined to be relevant to that agency. This information can be queried to identify, for a given agency, the set of bills, public laws, etc. that are closely connected to the agency. Documents that are connected in a number of different ways to an agency can be ranked higher in the search results, and the type of connections can be displayed to the user. The user can then click on each of the documents in the list, read their descriptions, and see their full network connections.

For example, FIG. 13 illustrates a user interface that provides the impact a public law has on the Department of Veterans Affairs agency. Specifically, FIG. 13 illustrates the degree, U.S.C. impact, and C.F.R. impact of a public law on the Department of Veterans Affairs. The "degree" score indicates the number of distinct types of connections a given law has to the agency. The U.S.C. Impact score can indicate the number of citations the public law makes to sections of the U.S.C. that are connected to the agency. The C.F.R. impact score can indicate the number of C.F.R. sections that are connected to the agency and the U.S.C. sections cited by the public law In addition, the systems and methods disclosed herein provide a novel way of evaluating the accuracy of agency impact predictions. In the U.S. regulatory system, agencies create regulations to update the C.F.R. in response to new laws. The final rules created by agencies represent actual changes made to the C.F.R., and can therefore be compared to predictions to assess the actual impact of new laws. As such, using the system described herein, each public law can be assigned a set of impacted agencies, called set P. Then, a set of relevant final rules can be found using the following criterion: (1) the final rule cites the parts of the USC that were cited by the public law; and (2) the final rule was created within 2 years of the end of the Congress that created the law. Using the set of final rules that meet these requirements, the agencies that published the rules can become the set of agencies, A, that are actually impacted. By comparing the set of impacted agencies to the set of predicted agencies, the precision and recall can be assessed for each public law.

EXAMPLES

Applicants applied the disclosed system herein to several agencies strategic documents about the operational impact of new laws and regulations.

Example 1—IRS

The Bipartisan Budget Act of 2015 amends the U.S.C. Internal Revenue Code for audits of large-for-profit partnerships. Existing audit rules are repealed and replaced with provisions for examinations to occur at the partnership level, rather than at the partner level. Historically, changes in IRS audit rules have led to the emergence of new strategies to circumvent the proposed regulations. Given the current estimated tax gap associated with flow through business entities such as partnerships to be $90B, efforts to help anticipate areas for potential non-compliance are critical. Accordingly, Applicants sought out to seek answers to the following questions utilizing their system: (1) What amendments/deletions/additions does H.R. 1314 make to existing partnership audit sections detailed in the Internal Revenue Code?; and (2) What implications might these changes have to the Internal Revenue Manual?

Figure 14:
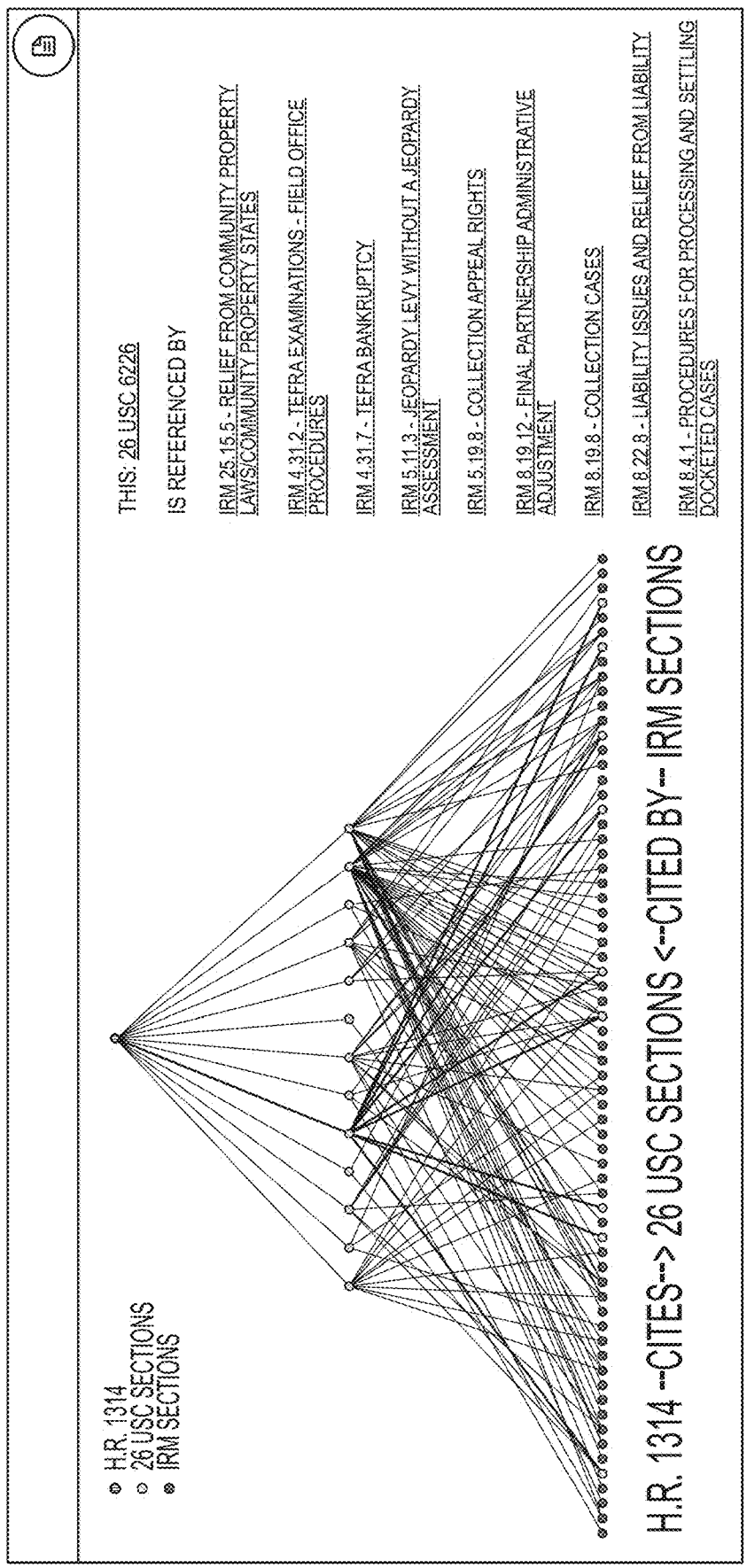
FIG. 14 illustrates a user interface showing the results of a query related to H.R. 1314.

Accordingly, Applicants ingested the H.R. 1314 bill Title XI into their system which parsed it and extracted references to U.S.C./C.F.R. and to sections of the Internal Revenue Manual. As shown in FIG. 14, Applicants discovered that H.R. 1314 cites 13 sections of the Internal Revenue Code (26 U.S.C.), which form the legal basis for over 60 sections of the Internal Revenue Manual (IRM).

Example 2—IRS

26 U.S.C. 6103 establishes the rules that taxpayer data can only be used for tax administration purposes. Applicants sought to determine: (1) What provisions of 6103 exist to share tax payer data and under what circumstances?; and (2) How does specific sections of the 6103 apply in an operational context?

Figure 15:
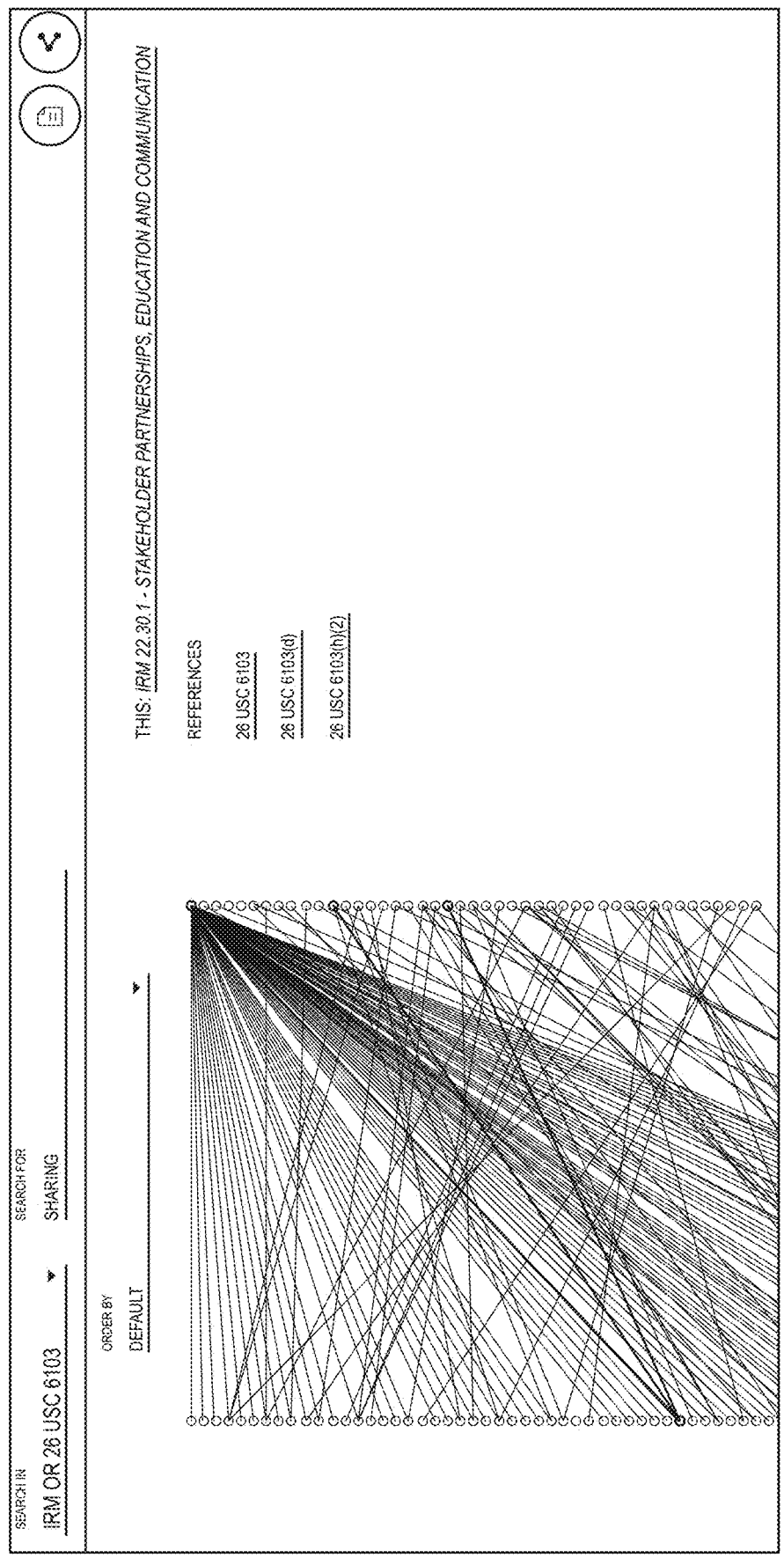
FIG. 15 illustrates a user interface showing the results of a query related to 26 U.S.C. 6103.

Applicants used the system to map the dependencies between the Section 6103 rules and the IRS internal Revenue Manual. As shown in FIG. 15, Applicants discovered that several sections of the IRM deal with partnerships, and point to U.S.C. sections on data sharing requirements and restrictions. The system helped detect relevant IRS rules and their legal bases.

Example 3—Veterans Affairs

The Veterans Access, Choice, and Accountability Act of 2014 made major changes to how veterans' issues are managed by the Department of Veterans Affairs, their subagencies, and healthcare partners. Applicants sought to determine how the VA Choice Act impacts existing healthcare law.

Figure 16:
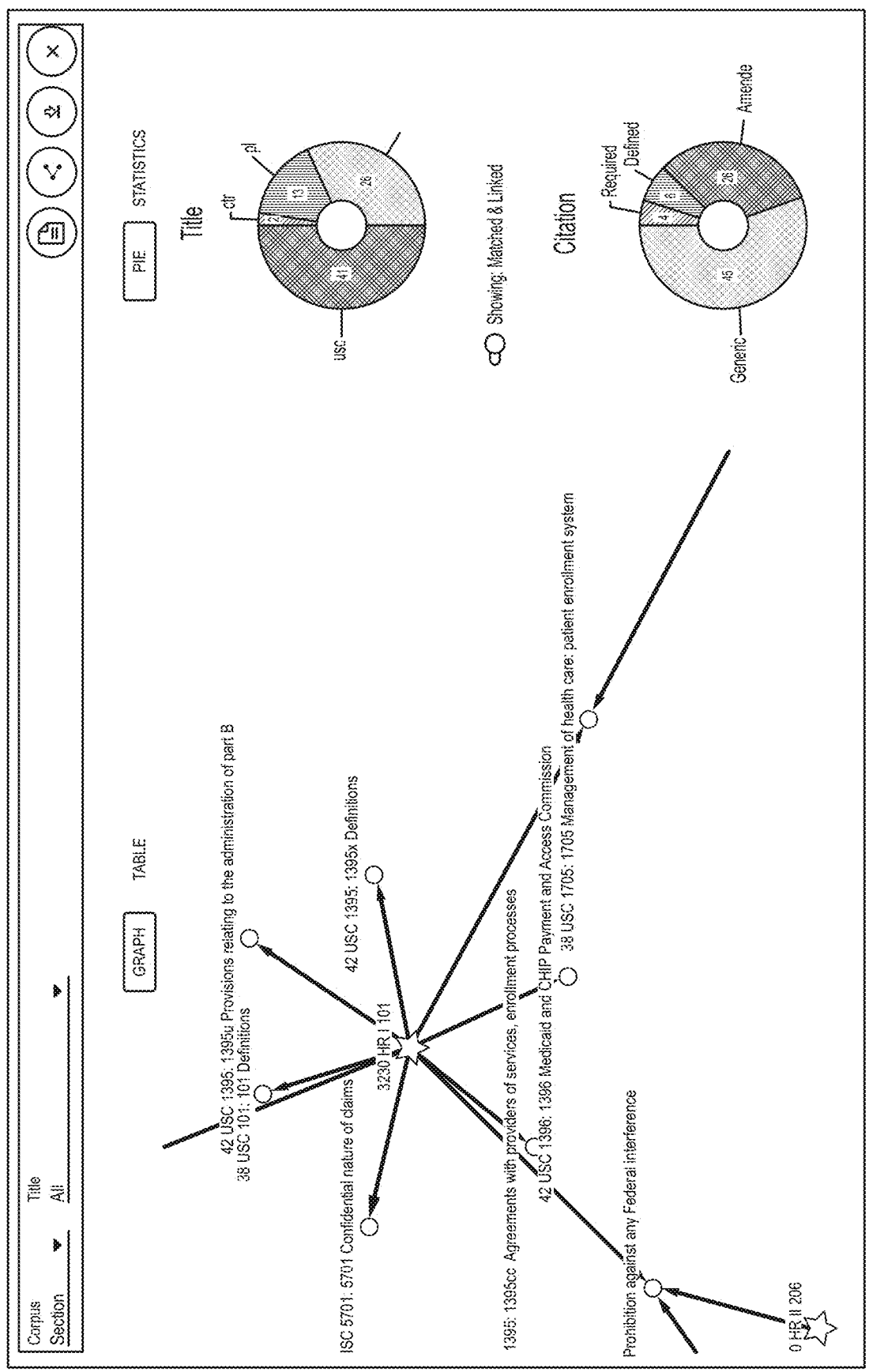
FIG. 16 illustrates a user interface showing the results of a query related to the VA Choice Act.

Applicants used the system to ingest and parse through the VA Choice Act to extract references to the U.S.C./C.F.R. and create a view of the data that enumerates dependencies arising from amendments/deletions/additions. The system was able to provide Applicants with FIG. 16 which illustrates the impact of the VACAA in one useful visual interface.

Example 4—Veterans Affairs 2

The VA Web Automated Reference Materials System (WARMS) provides a collection of VA claim forms and policies for a variety of topics. These forms are based on VA Regulations (38 C.F.R.) which outline programs and their qualification requirements. With thousands of sections of hundreds of thousands of words in 38 C.F.R., the size prohibits manual search techniques. Applicants sought to determine: (1) Which sections are more relevant to the VA Benefits forms?; and (2) Which parts of WARMS and the CFR deal with a given topic?

Figure 17:
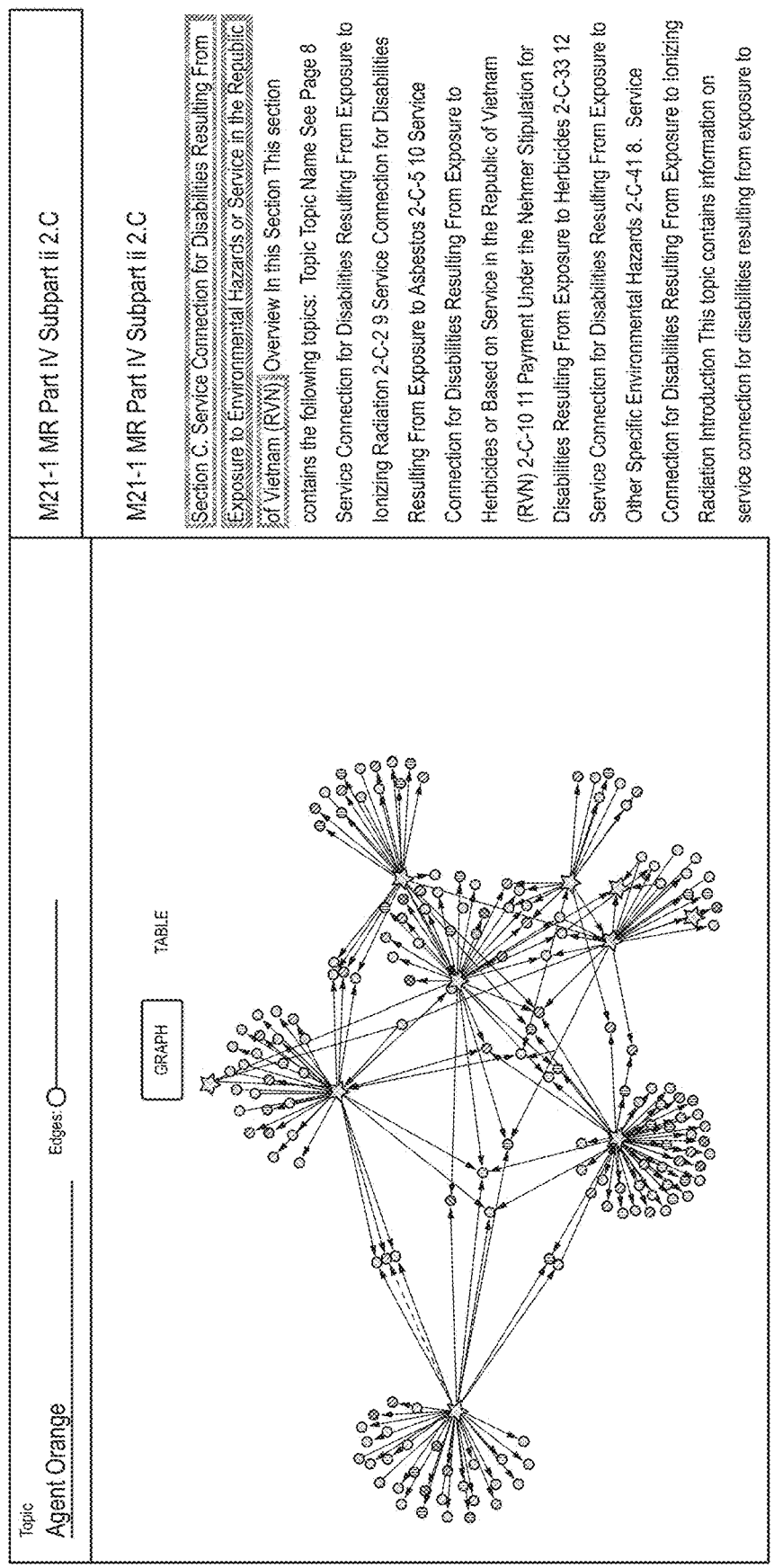
FIG. 17 illustrates a user interface showing additional results of a query related to H.R. 1314.

Applicants used the system to ingest and parse through H.R. 1314 bill Title XI to extract references to U.S.C./C.F.R. and to sections of the IRM. Applicants determined that 38 C.F.R. 3.400 and 3.500 are the most central nodes in the 38 U.S.C. WARMS M21 sub-network as these deal with benefits, apportionments, and discontinuances. Lastly, as shown in FIG. 17, Applicants discovered that the VA Laws, Regulations, Policies, and Forms dealing with claims relating to Agent Orange are spread across a number of VA policies in WARMS, which have connections to the U.S.C., C.F.R., public laws, and other VA forms.

Computer System

Figure 19:
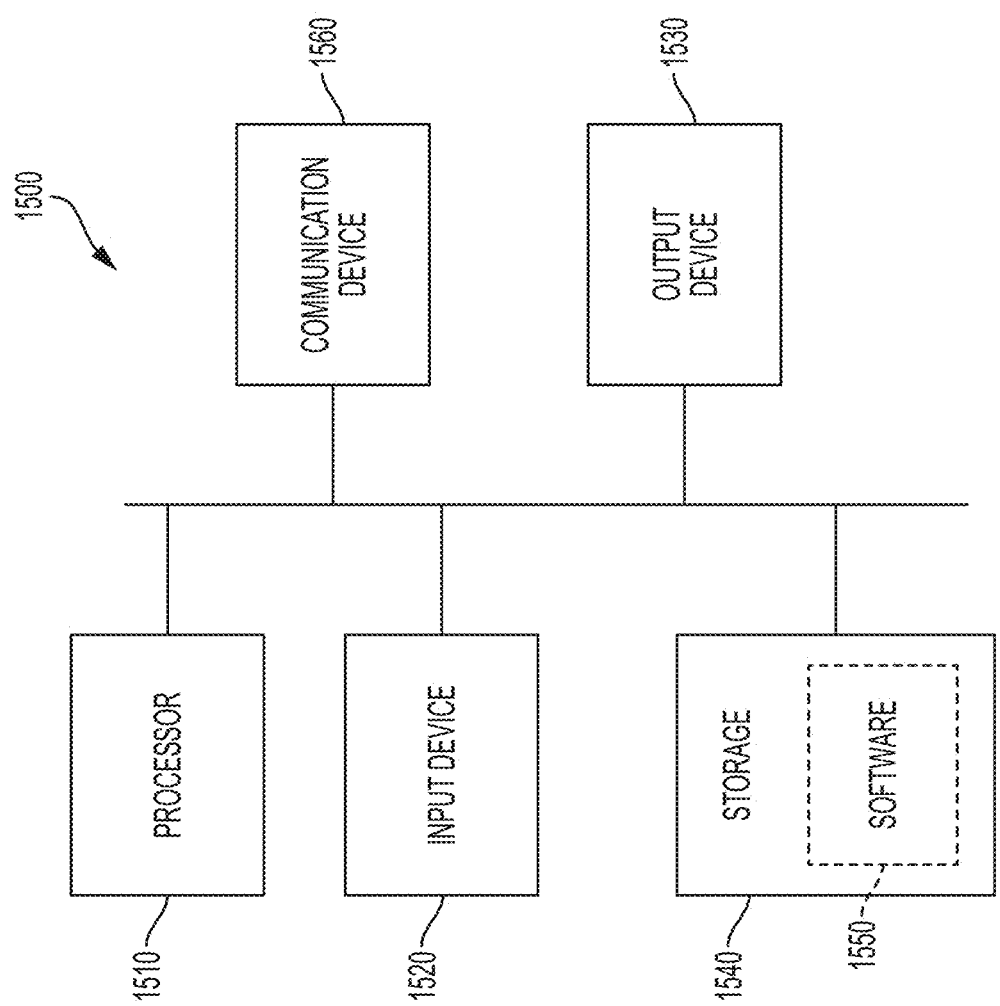
FIG. 19 illustrates an example of a computer in accordance with one embodiment.

FIG. 19 illustrates an example of a computer in accordance with one embodiment. Computer 1500 can be a component of a system for implementing the web based application according to the algorithms, methods, and systems described above or can include the entire system itself. In some embodiments, computer 1500 is configured to perform a method for determining the impact of a federal public law or federal bill on a federal agency as described herein. Computer 1500 can be a host computer connected to a network. Computer 1500 can be a client computer or a server. As shown in FIG. 19, computer 1500 can be any suitable type of microprocessor-based device, such as a personal computer, workstation, server, or handheld computing device, such as a phone or tablet. The computer can include, for example one or more of processor 1510, input device 1520, output device 1530, storage 1540, and communication device 1560. Input device 1520 and output device 1530 can generally correspond to those described above and can either be connectable or integrated with the computer.

Input device 1520 can be any suitable device that provides input, such as touch screen or monitor, keyboard, mouse, or voice-recognition device. Output device 1530 can be any suitable device that provides output, such as a touch screen, monitor, printer, disk drive, or speaker.

Storage 1540 can be any suitable device that provides storage, such as an electrical, magnetic, or optical memory, including a RAM, cache, hard drive, CD-ROM drive, tape drive, or removable storage disk. Communication device 1560 can include any suitable device capable of transmitting and receiving signals over a network, such as a network interface chip or card. The components of the computer can be connected in any suitable manner, such as via a physical bus or wirelessly. Storage 1540 can be a non-transitory computer readable storage medium comprising one or more programs, which, when executed by one or more processors, such as processor 1510, cause the one or more processors to perform methods described herein.

Software 1550, which can be stored in storage 1540 and executed by processor 1510, can include, for example, the programming that embodies the functionality of the present disclosure (e.g., as embodied in the systems, computers, servers, and/or devices as described above). In some embodiments, software 1550 can include a combination of servers such as application servers and database servers.

Software 1550 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1540, that can contain or store programming for use by or in connection with an instruction execution system, apparatus, or device.

Software 1550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computer 1500 may be connected to a network, which can be any suitable type of interconnected communication system. The network can implement any suitable communications protocol and can be secured by any suitable security protocol. The network can comprise networks links of any suitable arrangement that can implement the transmission and reception of network signals, such as wireless network connections, T1 or T3 lines, cable networks, DSL, or telephone lines.

Computer 1500 can implement any operating system suitable for operating on the network. Software 1550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

This application discloses several numerical ranges in the text and figures. The numerical ranges disclosed inherently support any range or value within the disclosed numerical ranges even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference

The invention claimed is:

1. A method for determining the impact of a federal public law on a federal agency, the method comprising:
   receiving a request from a user to determine the impact of the federal public law on the federal agency;
   querying a citation network for paths between a node associated with the federal public law and a node associated with the federal agency, wherein the citation network comprises:
   a plurality of nodes including a node for each federal agency from a plurality of federal agencies, a node for each title of the Code of Federal Regulations (CFR), a node for each title of the Code of Laws of the United States of America (U.S.C.), and a node for each federal public law from a plurality of federal public laws; and a plurality of edges including:
  edges between nodes that model citation relationships between sections of legal corpora comprising the CFR, the USC, and the plurality of federal public laws,
  edges between nodes for CFR titles and corresponding nodes for federal agencies,
  edges between nodes for U.S.C. titles and corresponding nodes for CFR titles, and;
  edges between nodes for federal public laws and nodes for U.S.C. titles; and displaying the queried paths of the citation network to enable the user to visualize the impact of the federal public law on the federal agency; and wherein the citation network is created based on parsing each document of the legal corpora by applying a citation parsing algorithm comprising:
  parsing a hierarchical structure of the document using a file format and the metadata structure of the document to identify a plurality of sections of the document and parent-child relations within the plurality of sections;
  applying regex patterns to the parsed document to identify citations to sections of other sections of the legal corpora and associating an identified citation with an identified section of the document in which that citation was identified; and
  generating an edge in the citation network between two nodes to represent the identified citation between the identified section of the document and the identified citation to another section of the legal corpora.

2. The method of claim 1, wherein querying the citation network comprises determining if edges exist:
  between the node of the federal public law in the request and a node of a U.S.C. title;
  between the node of the U.S.C. title and a node of a C.F.R. title; and
  between the node of the C.F.R. title and a node of the federal agency.

3. The method of claim 2, further comprising in response to determining that the edges exist between the node of the requested federal public law and the node of the U.S.C. title, between the node of the U.S.C. title and the node of the C.F.R. title, and between the node of the C.F.R. title and the node of the federal agency, displaying the edges and nodes between the federal public law, the U.S.C. title, the C.F.R. title, and the requested federal agency.

4. The method of claim 1, comprising creating the edges between nodes for the CFR titles and the corresponding nodes for the federal agencies by:
  determining titles of the CFR that are relevant to a federal agency based on determining federal agencies that are named in C.F.R. titles.

5. The method of claim 1, wherein creating the citation network comprises:
  applying the citation parsing algorithm to documents of the Federal Register to identify citations to C.F.R. titles in rules in the Federal Register; and
  adding edges connecting a federal agency to a specific C.F.R. title cited in a rule in the Federal Register issued by the federal agency.

6. The method of claim 1, wherein creating the citation network further comprises:
  creating a node for a federal bill;
  applying the citation parsing algorithm on documents of the federal bill to identify citations to one or more sections of the U.S.C.; and
  in response to determining a citation to the U.S.C. in the federal bill, creating an edge between the corresponding cited U.S.C. title node and the federal bill node.

7. The method of claim 6, further comprising determining a federal agency associated with the federal bill using the citation network.

8. The method of claim 1, wherein creating the citation network further comprises:
  creating a node for an Executive Order;
  applying the citation parsing algorithm on documents of the Executive Order to identify citations to one or more sections of the C.F.R.; and
  in response to determining a citation to the C.F.R. in the Executive Order, creating an edge between the corresponding cited C.F.R. title node and the Executive Order node.

9. The method of claim 8, further comprising determining a federal agency associated with the Executive Order using the citation network.

10. A non-transitory computer readable storage medium storing one or more programs, the one or more programs comprising instructions, which when executed by an electronic device, cause the device to:
  receive a request from a user to determine the impact of federal public law one a federal agency;
  query a citation network for paths between a node associated with the federal public law and a node associated with the federal agency, wherein the citation network comprises:
    a plurality of nodes including a node for each federal agency from a plurality of federal agencies, a node for each title of the Code of Federal Regulations (CFR), a node for each title of the Code of Laws of the United States of America (U.S.C.), and a node for each federal public law from a plurality of federal public laws; and
    a plurality of edges including:
      edges between nodes that model citation relationships between sections of legal corpora comprising the CFR, the USC, and the plurality of federal public laws,
      edges between nodes for CFR titles and corresponding nodes for federal agencies,
      edges between nodes for U.S.C. titles and corresponding nodes for CFR titles, and;
      edges between nodes for federal public laws and nodes for U.S.C. titles; and
  displaying the queried paths of the citation network to enable the user to visualize the impact of the federal public law on the federal agency; and
  wherein the citation network is created based on parsing each document of the legal corpora by applying a citation parsing algorithm comprising:
    parsing a hierarchical structure of the document using a file format and the metadata structure of the document to identify a plurality of sections of the document and parent-child relations within the plurality of sections;
    applying regex patterns to the parsed document to identify citations to sections of other sections of the legal corpora and associating an identified citation with an identified section of the document in which that citation was identified; and generating an edge in the citation network between two nodes to represent the identified citation between the identified section of the document and the identified citation to another section of the legal corpora.

11. An electronic device, comprising one or more processors;
memory; and
one or more programs, wherein the one or more programs are stored in the memory and configured to be executed by the one or more processors, the one or more programs including instructions for:
receiving a request from a user to determine the impact of a federal public law one a federal agency;
querying a citation network for paths between a node associated with the federal public law and a node associated with the federal agency, wherein the citation network comprises:
  a plurality of nodes including a node for each federal agency from a plurality of federal agencies, a node for each title of the Code of Federal Regulations (CFR), a node for each title of the Code of Laws of the United States of America (U.S.C.), and a node for each federal public law from a plurality of federal public laws; and
  a plurality of edges including:
    edges between nodes that model citation relationships between sections of legal corpora comprising the CFR, the USC, and the plurality of federal public laws,
    edges between nodes for CFR titles and corresponding nodes for federal agencies,
    edges between nodes for U.S.C. titles and corresponding nodes for CFR titles, and;
    edges between nodes for federal public laws and nodes for U.S.C. titles; and
displaying the queried paths of the citation network to enable the user to visualize the impact of the federal public law on the federal agency; and
wherein the citation network is created based on parsing each document of the legal corpora by applying a citation parsing algorithm comprising:
  parsing a hierarchical structure of the document using a file format and the metadata structure of the document to identify a plurality of sections of the document and parent-child relations within the plurality of sections;
  applying regex patterns to the parsed document to identify citations to sections of other sections of the legal corpora and associating an identified citation with an identified section of the document in which that citation was identified; and
  generating an edge in the citation network between two nodes to represent the identified citation between the identified section of the document and the identified citation to another section of the legal corpora.

* * * * *